United States Patent
Gillis et al.

(10) Patent No.: US 12,222,297 B2
(45) Date of Patent: Feb. 11, 2025

(54) METHODS AND APPARATUS FOR INSPECTING A MATERIAL

(71) Applicant: CORNING INCORPORATED, Corning, NY (US)

(72) Inventors: Earle William Gillis, Elmira, NY (US); Aaron Russell Greenbaum, Pittsford, NY (US)

(73) Assignee: CORNING INCORPORATED, Corning, NY (US)

( * ) Notice: Subject to any disclaimer, the term of this patent is extended or adjusted under 35 U.S.C. 154(b) by 231 days.

(21) Appl. No.: 18/015,785

(22) PCT Filed: Aug. 3, 2021

(86) PCT No.: PCT/US2021/044259
§ 371 (c)(1),
(2) Date: Jan. 12, 2023

(87) PCT Pub. No.: WO2022/031644
PCT Pub. Date: Feb. 10, 2022

(65) Prior Publication Data
US 2023/0314337 A1    Oct. 5, 2023

Related U.S. Application Data

(60) Provisional application No. 63/060,896, filed on Aug. 4, 2020.

(51) Int. Cl.
*G01N 21/896* (2006.01)
*G06T 7/00* (2017.01)
(Continued)

(52) U.S. Cl.
CPC ......... *G01N 21/896* (2013.01); *G06T 7/0008* (2013.01); *G06T 7/571* (2017.01); *H04N 23/695* (2023.01)

(58) Field of Classification Search
CPC ... G01N 2021/8909; G01N 2021/8967; G01N 21/8903; G01N 21/896;
(Continued)

(56) References Cited

U.S. PATENT DOCUMENTS 7,800,749 B2   9/2010   Leblanc et al.
9,389,187 B2   7/2016   Furnas
(Continued)

FOREIGN PATENT DOCUMENTS

CN   101652625 A   2/2010
TW   200804797 A   1/2008
(Continued)

OTHER PUBLICATIONS

Taiwanese Patent Application No. 110128505, Office Action dated Sep. 30, 2024, 2 pages (English Translation only), Taiwanese Patent Office.

*Primary Examiner* — Peter B Kim

(57) ABSTRACT

Methods of inspecting a material include moving the material and identifying a defect location of a defect. Methods include moving a camera along a second travel path in a second travel direction such that a field of view (FOV) of the camera moves relative to the material along the second travel path to match the defect location. Methods include passing the defect through the field of view (FOV) as the material moves and capturing images of the defect with the camera as the material moves and the defect moves through the FOV. The images include a first image of a first major surface, a second image of a second major surface, and a third image of an intermediate portion of the material between the first major surface and the second major surface. Methods include reviewing the plurality of images to characterize the defect.

20 Claims, 12 Drawing Sheets

(51) Int. Cl.
*G06T 7/571* (2017.01)
*H04N 23/695* (2023.01)

(58) Field of Classification Search
CPC ......... G06T 2207/10016; G06T 7/0004; G06T 7/0008; H04N 21/695
See application file for complete search history.

(56) References Cited

U.S. PATENT DOCUMENTS

| | | |
|---|---|---|
| 9,436,990 B2 | 9/2016 | Otani et al. |
| 9,933,373 B2 | 4/2018 | Vild et al. |
| 10,067,065 B1 | 9/2018 | Alam et al. |
| 2007/0216897 A1* | 9/2007 | Sonda ................ G01N 21/896 356/239.8 |
| 2007/0229814 A1 | 10/2007 | Yamaguchi |
| 2008/0198366 A1 | 8/2008 | LeBlanc |
| 2008/0297784 A1 | 12/2008 | LeBlanc et al. |
| 2010/0074515 A1 | 3/2010 | Zhao et al. |
| 2010/0296084 A1 | 11/2010 | Berg et al. |
| 2014/0226004 A1 | 8/2014 | Son et al. |
| 2014/0240489 A1 | 8/2014 | Furnas |
| 2019/0257765 A1 | 8/2019 | Goers et al. |
| 2020/0064197 A1 | 2/2020 | Furnas |

FOREIGN PATENT DOCUMENTS

| | | |
|---|---|---|
| TW | 200902960 A | 1/2009 |
| TW | 201825891 A | 7/2018 |
| WO | 2012/077683 A1 | 6/2012 |

\* cited by examiner

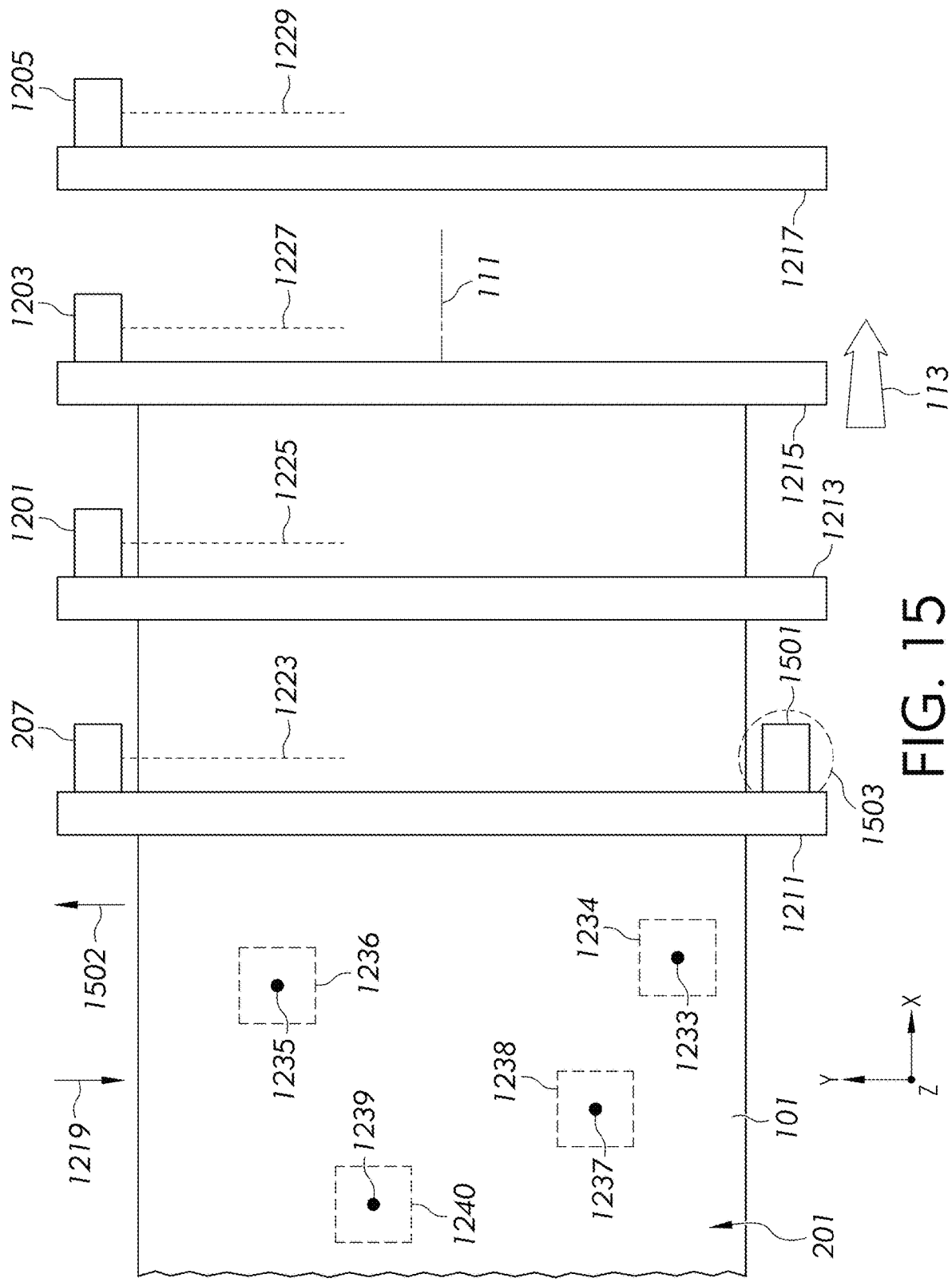

METHODS AND APPARATUS FOR INSPECTING A MATERIAL

CROSS-REFERENCE TO RELATED APPLICATIONS

This is a national stage application under 35 U.S.C. § 371 of International Application No. PCT/US2021/044259 filed on Aug. 3, 2021, which claims the benefit of priority under 35 U.S.C. § 119 of U.S. Provisional Application Ser. No. 63/060,896 filed on Aug. 4, 2020, the content of which is relied upon and incorporated herein by reference in their entireties.

FIELD

The present disclosure relates generally to methods for inspecting a material and, more particularly, to methods for inspecting a material with an inspection apparatus comprising a camera.

BACKGROUND

Glass ribbons are commonly used, for example, in display applications, such as liquid crystal displays (LCDs), electrophoretic displays (EPDs), organic light emitting diode displays (OLEDs), plasma display panels (PDPs), touch sensors, photovoltaics, or the like. Such displays can be incorporated, for example, into mobile phones, tablets, laptops, watches, wearables and/or touch capable monitors or displays. Glass ribbons can be inspected with a camera that captures images of the glass ribbon, whereupon the images are inspected for defects within the glass ribbon. The inspection process can be time-consuming and costly, since motion of the glass ribbon may frequently be stopped for inspection. Further, inspecting a volume or interior portion of the glass ribbon between the major surfaces can be difficult and inaccurate. As such, there is a need for methods of inspecting a material, for example, a glass ribbon, that can more effectively and quickly inspect the material.

SUMMARY

The following presents a simplified summary of the disclosure to provide a basic understanding of some embodiments described in the detailed description.

In some embodiments, an inspection apparatus can comprise a first inspection apparatus and a second inspection apparatus. As a material moves continuously, the first inspection apparatus can identify a defect location of a defect in the material. The second inspection apparatus can revisit the defect location by capturing a plurality of images of the defect. For example, the second inspection apparatus can comprise one or more cameras. In some embodiments, one camera can capture images of a first major surface, a second camera can capture images of a second major surface, and a third camera can capture images of an intermediate portion of the material between the first major surface and the second major surface. In some embodiments, based on the images captured of the intermediate portion, a position of a defect located within the intermediate portion can be determined. In addition, in some embodiments, the one or more cameras can be movable along an axis, for example, a Y-axis that is perpendicular to a movement direction of the material and parallel to the first major surface. By moving the one or more cameras along the Y-axis, the one or more cameras can capture images of a plurality of defects at a plurality of locations along the Y-axis as the material continuously moves.

In some embodiments, methods of inspecting a material can comprise moving the material along a first travel path in a first travel direction. Methods can comprise identifying a defect location of a defect in the material. Methods can comprise moving a camera along a second travel path in a second travel direction substantially perpendicular to the first travel direction such that a field of view (FOV) of the camera moves relative to the material along the second travel path to match the defect location, the second travel path parallel to a first major surface of the material. Methods can comprise passing the defect through the field of view (FOV) as the material moves along the first travel path. Methods can comprise capturing a plurality of images of the defect with the camera as the material moves in the first travel direction and the defect moves through the FOV. The plurality of images can comprise a first image of the first major surface of the material at the defect location, a second image of a second major surface of the material at the defect location, and a third image of an intermediate portion of the material between the first major surface and the second major surface at the defect location. Methods can comprise reviewing the plurality of images to characterize the defect.

In some embodiments, the moving the material comprises continuously moving the material along the first travel path while the plurality of images are captured.

In some embodiments, the capturing the plurality of images can comprise capturing a fourth image of the material prior to the defect passing through the field of view (FOV) and a fifth image of the material after the defect exits the field of view (FOV).

In some embodiments, the capturing the plurality of images can comprise exposing the defect location to light from an illumination source, the illumination source comprising one or more of a dark-field illumination source, a coaxial illumination source, a gradient illumination source, a diffuse illumination source, a cloudy day illumination source, a bright-field illumination source, a structured light illumination source, or a laser illumination source.

In some embodiments, the identifying the defect location can occur prior to moving the camera and capturing the plurality of images.

In some embodiments, the material can comprise a glass ribbon.

In some embodiments, methods of inspecting a material can comprise moving the material along a first travel path in a first travel direction. Methods can comprise identifying a defect location of a defect in the material. Methods can comprise moving a camera along a second travel path in a second travel direction substantially perpendicular to the first travel direction such that a field of view (FOV) of the camera moves relative to the material along the second travel path to match a position of the defect location. The second travel path can be parallel to a first major surface of the material. A camera axis between the camera and the first major surface can form an angle relative to the first major surface that is within a range from about 3 degrees to about 85 degrees. Methods can comprise passing the defect through the field of view (FOV) as the material moves along the first travel path. Methods can comprise capturing, with the camera, a plurality of images of an intermediate portion of the material between the first major surface and a second major surface of the material at the defect location. Methods can comprise reviewing the plurality of images to determine a depth of the defect from the first major surface.

In some embodiments, the capturing the plurality of images can comprise capturing a first image of the defect when the defect is within the intermediate portion, a second image of the defect within the intermediate portion a first period of time after capturing the first image, and a third image of the defect within the intermediate portion a second period of time after capturing the second image.

In some embodiments, the reviewing the plurality of images can comprise comparing a sharpness of the first image, the second image, and the third image to determine the depth.

In some embodiments, the first image can be captured prior to the defect entering a depth of field of the camera, the second image can be captured with the defect located within the depth of field, and the third image can be captured after the defect exits the depth of field.

In some embodiments, methods of inspecting a material can comprise moving the material along a first travel path in a first travel direction. Methods can comprise identifying a first defect location of a first defect and a second defect location of a second defect in the material. Methods can comprise moving a first camera along a second travel path in a second travel direction substantially perpendicular to the first travel direction such that a first field of view (FOV) of the first camera moves relative to the material along the second travel path to match the first defect location, the second travel path parallel to a first major surface of the material. Methods can comprise moving a second camera along a third travel path in the second travel direction substantially parallel to the second travel path such that a second field of view (FOV) of the second camera moves relative to the material along the third travel path to match the second defect location. Methods can comprise passing the first defect through the first field of view (FOV) as the material moves along the first travel path. Methods can comprise passing the second defect through the second field of view (FOV) as the material moves along the first travel path. Methods can comprise capturing a first image of a first portion of the material at the first defect location with the first camera. Methods can comprise capturing a second image of a second portion of the material at the second defect location with the second camera. Methods can comprise reviewing the first image and the second image to characterize the first defect and the second defect. The characterizing can comprise determining one or more of a location of the first defect and the second defect, a type of the first defect and the second defect, or a size of the first defect and the second defect.

In some embodiments, the moving the material can comprise continuously moving the material along the first travel path while the first image and the second image are captured.

In some embodiments, a speed of the material along the first travel path in the first travel direction may be within a range from about 25 mm/s to about 500 mm/s, and wherein a speed of the first camera along the first travel path in the first travel direction is zero.

In some embodiments, an exposure time of one or more of the first camera or the second camera may be less than about 2 microseconds In some embodiments, the passing the first defect through the first field of view (FOV) can occur prior to the second defect passing through the second field of view (FOV) with the third travel path located downstream from the second travel path relative to the first travel direction.

In some embodiments, methods can comprise moving a third camera along the second travel path in the second travel direction such that a third field of view (FOV) of the third camera can move relative to the material along the second travel path to match a third defect location of a third defect in the material.

In some embodiments, the first image can comprise one or more of the first major surface of the material at the first defect location, a second major surface of the material at the first defect location, or an intermediate portion of the material between the first major surface and the second major surface at the first defect location.

In some embodiments, methods can comprise, after capturing the first image, moving the first camera along the second travel path in the second direction such that the first field of view (FOV) matches a third defect location of a third defect in the material.

In some embodiments, methods can comprise passing the third defect through the first field of view (FOV) as the material moves along the travel path and capturing a third image of a third portion of the material at the third defect location with the first camera.

In some embodiments, methods can comprise orienting a camera axis of the first camera at an angle relative to the first major surface within a range from about 3 degrees to about 85 degrees such that the first image of the first portion comprises an intermediate portion of the material between the first major surface and a second major surface of the material. In some embodiments, the reviewing the first image and the second image can comprise determining a depth of the first defect from the first major surface.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other features, embodiments and advantages are better understood when the following detailed description is read with reference to the accompanying drawings, in which:

FIG. 15 illustrates a side view of the second inspection apparatus comprising a plurality of camera apparatuses arranged along one axis in accordance with embodiments of the disclosure.

DETAILED DESCRIPTION

Figure 1:
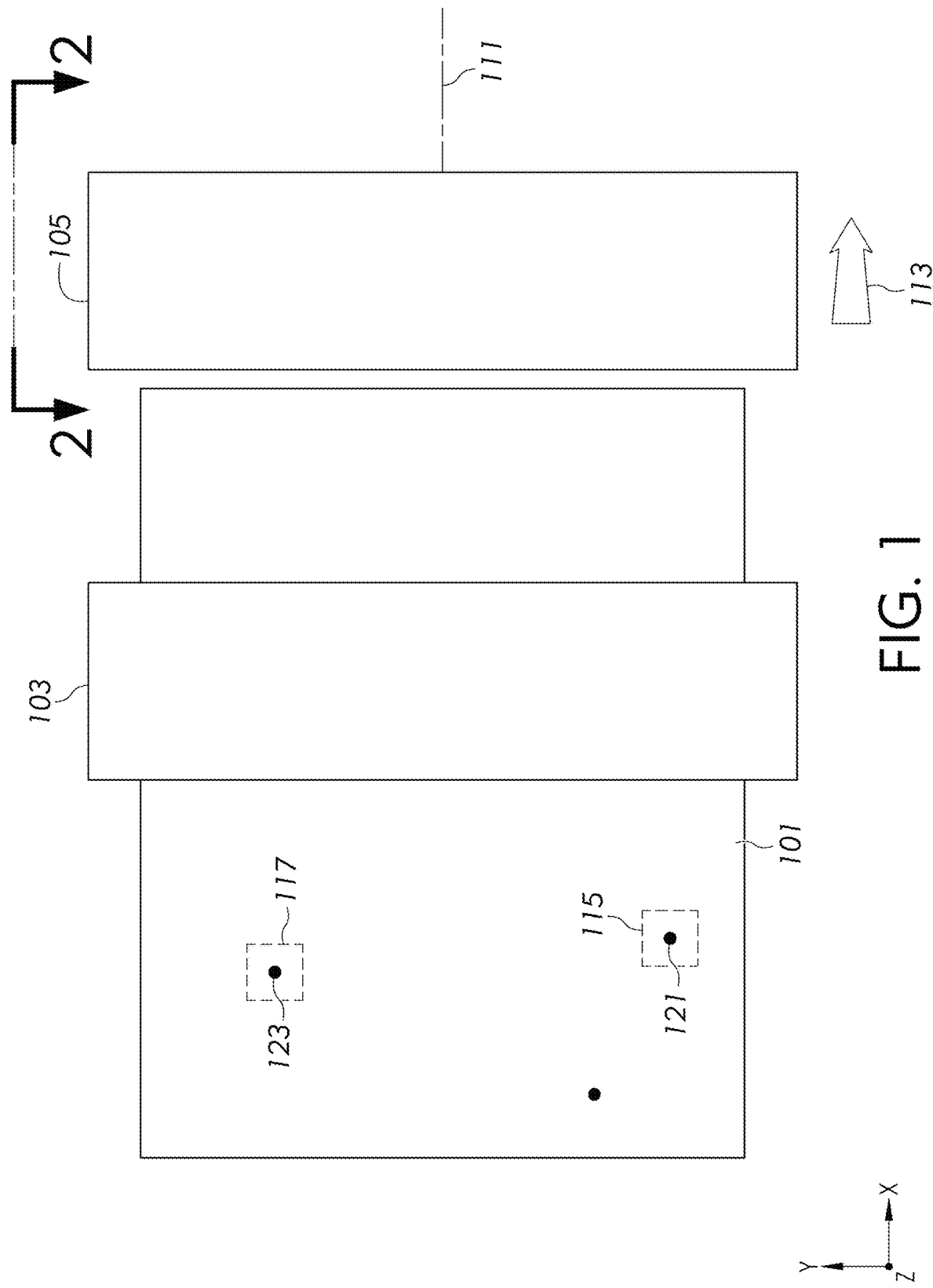
FIG. 1 schematically illustrates example embodiments of an inspection apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

As used herein, the term "about" means that amounts, sizes, formulations, parameters, and other quantities and characteristics are not, and need not be, exact, but may be approximate and/or larger or smaller, as desired, reflecting tolerances, conversion factors, rounding off, measurement error and the like, and other factors known to those of skill in the art.

Ranges can be expressed herein as from "about" one value, and/or to "about" another value. When such a range is expressed, another embodiment includes from the one value to the other value. Similarly, when values are expressed as approximations by use of the antecedent "about," it will be understood that the value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to represent that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Modifications may be made to the instant disclosure without departing from the scope or spirit of the claimed subject matter. Unless specified otherwise, "first," "second," or the like are not intended to imply a temporal aspect, a spatial aspect, an ordering, a quantity, etc. Rather, such terms are merely used as identifiers, names, etc. for features, elements, items, etc. For example; a first end and a second end generally correspond to end A and end B or two different or two identical ends or the same end. Likewise, capturing a second image may occur before capturing a first image, after capturing a first image, and/or without capturing a first image.

The present disclosure relates to an inspection apparatus and methods for inspecting a material 101. Methods and apparatus for inspecting the material 101 will now be described by way of example embodiments. In some embodiments, the material 101 can comprise a glass ribbon from a ribbon of glass-forming material. For purposes of this application, a "glass ribbon" is considered one or more of a glass ribbon in a viscous state, a glass ribbon in an elastic state (e.g., at room temperature), and/or a glass ribbon in a viscoelastic state between the viscous state and the elastic state. In some embodiments, the glass ribbon can comprise a glass sheet that may be separated from another portion of the glass ribbon. In some embodiments, the material 101 may not be limited to comprising the glass ribbon. Rather, in some embodiments, the material 101 can comprise one or more of a plastic material, a cell-culture gel, a computer chip, an opaque material, a transparent material, etc. As schematically illustrated in FIG. 1, in some embodiments, the material 101 can be inspected by an inspection system comprising one or more inspection apparatuses, for example, a first inspection apparatus 103 and a second inspection apparatus 105. Methods of inspecting the material 101 can comprise moving (e.g., conveying) the material 101 along a first travel path 111 in a first travel direction 113. The first inspection apparatus 103 and the second inspection apparatus 105 can be positioned adjacent to the first travel path 111 such that as the material 101 moves in the first travel direction 113 along the first travel path 111, the material 101 can be inspected by the first inspection apparatus 103 and the second inspection apparatus 105. In some embodiments, the second inspection apparatus 105 can be located downstream from the first inspection apparatus 103 relative to the first travel direction 113 such that as the material 101 moves along the first travel path 111, the material 101 can first pass the first inspection apparatus 103 before passing the second inspection apparatus 105.

The first inspection apparatus 103 can comprise one or more cameras that can inspect the material 101 as the material 101 passes by the first inspection apparatus 103, such that the first inspection apparatus 103 can comprise a linescan camera. In some embodiments, the first inspection apparatus 103 can comprise, in addition to the one or more cameras, one or more of illumination source(s), computer(s), power supply, controller(s), etc. By inspecting the material 101, the first inspection apparatus 103 can capture one or more images of the material 101. The one or more images of the material 101 can be reviewed, for example, by a user to visually inspect, for a computer to process and inspect, etc. Upon the review of the material 101, in some embodiments, one or more defects within the material 101 can be identified. In some embodiments, the first inspection apparatus 103 can identify a defect location 115, 117 of the one or more defects. In some embodiments, methods can comprise identifying a defect location of a defect in the material 101, for example, identifying a first defect location 115 of a first defect 121, a second defect location 117 of a second defect 123 in the material 101, etc. Following the identification of the defect locations 115, 117 of the one or more defects 121, 123 by the first inspection apparatus 103, the second inspection apparatus 105 can capture images of the defect locations 115, 117 such that the one or more defects 121, 123 can be reviewed or characterized (e.g., quantified in size, location from an edge of the material 101, location within a thickness of the material 101, etc.). As illustrated in FIG. 1, in some embodiments, the material 101 can move along the X-axis, such that that the first travel direction 113 may be parallel with the X-axis. The material 101 can therefore comprise a thickness (e.g., between a first major surface and a second major surface) that may be measured along the Z-axis orthogonal to the X-axis.

Figure 2:
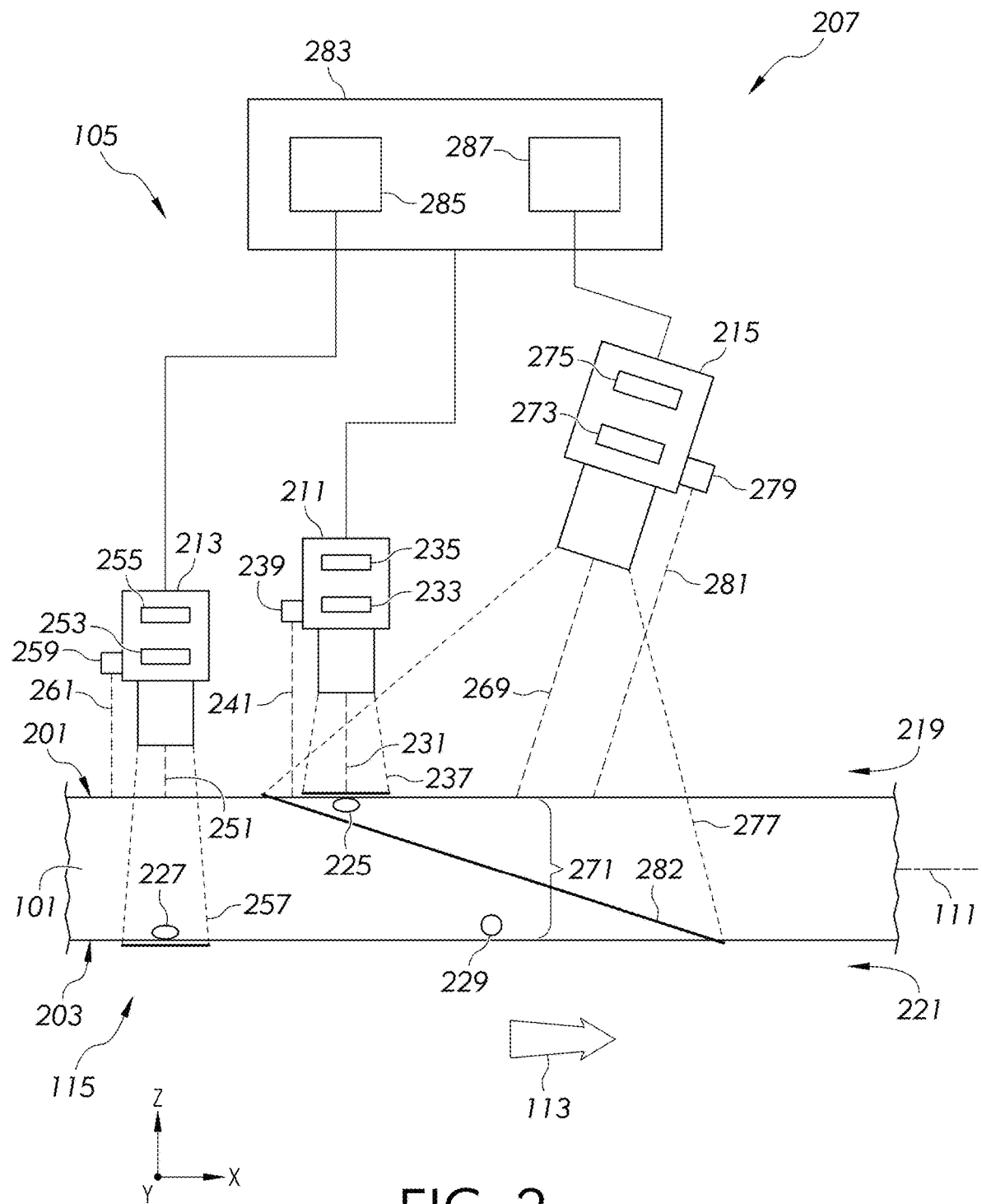
FIG. 2 illustrates a top-down view of the inspection apparatus along line 2-2 of FIG. 1 in accordance with embodiments of the disclosure.

Referring to FIG. 2, a top-down view of the material 101 and the second inspection apparatus 105 is illustrated along line 2-2 of FIG. 1. In some embodiments, the material 101 can comprise a first major surface 201 and a second major surface 203 facing opposite directions and defining a thickness of the material 101 therebetween. In some embodiments, the thickness of the material 101 can be less than or equal to about 2 millimeters (mm), less than or equal to about 1 millimeter, less than or equal to about 0.5 millimeters, for example, less than or equal to about 300 micrometers (μm), less than or equal to about 200 micrometers, or less than or equal to about 100 micrometers, although other thicknesses may be provided in further embodiments. For example, in some embodiments, the thickness of the material 101 can be within a range from about 20 micrometers to about 200 micrometers, within a range from about 50 micrometers to about 750 micrometers, within a range from about 100 micrometers to about 700 micrometers, within a range from about 200 micrometers to about 600 micrometers, within a range from about 300 micrometers to about 500 micrometers, within a range from about 50 micrometers to about 500 micrometers, within a range from about 50 micrometers to about 700 micrometers, within a range from about 50 micrometers to about 600 micrometers, within a range from about 50 micrometers to about 500 micrometers, within a range from about 50 micrometers to about 400 micrometers, within a range from about 50 micrometers to about 300 micrometers, within a range from about 50 micrometers to about 200 micrometers, within a range from about 50 micrometers to about 100 micrometers, within a range from about 25 micrometers to about 125 micrometers, comprising all ranges and subranges of thicknesses therebetween. In addition, the material 101 can comprise a variety of compositions. For example, when the material 101 comprises a glass material, the material 101 can comprise borosilicate glass, alumino-borosilicate glass, alkali-containing glass, or alkali-free glass, alkali aluminosilicate glass, alkaline earth aluminosilicate glass, soda-lime glass, glass ceramic, etc. In some embodiments, the material 101 can be processed into a desired application, e.g., a display application. For example, the material 101 can be used in a wide range of display applications, comprising liquid crystal displays (LCDs), electrophoretic displays (EPD), organic light emitting diode displays (OLEDs), plasma display panels (PDPs), touch sensors, photovoltaics, and other electronic displays.

In some embodiments, the material 101 can be moved continuously along the first travel path 111 in the first travel direction 113. In some embodiments, by being moved continuously, the material 101 may not stop moving during inspection by the second inspection apparatus 105, such that a velocity of the material 101 may remain above zero as the material 101 passes the second inspection apparatus 105. In some embodiments, the material 101 can maintain a velocity that is at least about 300 mm/s while moving along the first travel path 111 in the first travel direction 113 past the second inspection apparatus 105. In some embodiments, the material 101 can maintain a constant velocity while moving past the second inspection apparatus 105. As such, the second inspection apparatus 105 can capture images of the material 101, for example, images of the defect locations 115, 117 while the material 101 is moving continuously. In some embodiments, the material 101 can move in the first travel direction 113 in the X-direction, while a height of the material 101 can lie in the Y-direction and a thickness of the material 101 can be defined in the Z-direction. The material 101 can be moved in several ways. For example, in some embodiments, the material 101 can rest upon a conveyance device (e.g., one or more rollers, a belt, air cushion, etc.) that can support a weight of the material 101 and can move the material 101 in the first travel direction 113. In some embodiments, the material 101 can be held by a gripping device (e.g., one or more suction grips, etc.) that can hold and move the material 101 in the first travel direction 113. In some embodiments, the structure which supports or holds the material 101 during conveyance or movement of the material 101 in the first travel direction 113 may not obscure the first major surface 201 and the second major surface 203 from being inspected (e.g., with images captured) by the second inspection apparatus 105.

FIG. 2 illustrates at least a portion of the second inspection apparatus 105. In some embodiments, the second inspection apparatus 105 can comprise one or more camera apparatuses, for example, a camera apparatus 207. In some embodiments, the camera apparatus 207 can comprise one or more cameras, for example, a first camera 211, a second camera 213, and/or a third camera 215. The camera apparatus 207 can be positioned on a side of the material 101, for example, a first side 219 of the material 101 facing the first major surface 201. In addition, or in the alternative, in some embodiments, the camera apparatus 207 can be positioned on a second side 221 of the material 101 facing the second major surface 203. As illustrated and described with respect to FIGS. 12-15, in some embodiments, the second inspection apparatus 105 may not be limited to one camera apparatus (e.g., the camera apparatus 207) as illustrated in FIG. 2, but, rather, the second inspection apparatus 105 may comprise additional camera apparatuses that may be located upstream or downstream from the camera apparatus 207 relative to the first travel direction 113. In some embodiments, the material 101 can comprise one or more defects (e.g., similar to the first defect 121 and/or the second defect 123 illustrated in FIG. 1). The defects can comprise, for example, one or more of a first defect 225, a second defect 227, or a third defect 229. The material 101 can comprise several types of defects 121, 123, 225, 227, 229, for example, scratches, inclusions, bubbles, surface discontinuities, or other types of defects with an opaque or transparent character. An opaque defect is one that is not transparent or translucent and can block or attenuate the passage of light through the opaque defect while a transparent defect is one that allows light to pass through. In some embodiments, the defects 121, 123, 225, 227, 229 can be located on one or more of the first major surface 201 (e.g., the first defect 225 located on the first major surface 201), the second major surface 203 (e.g., the second defect 227 located on the second major surface 203), or within a volume or interior portion of the material 101 between the first major surface 201 and the second major surface 203 (e.g., the third defect 229 located within the volume or interior portion of the material 101).

In some embodiments, the first camera 211 can comprise a digital camera with a first camera axis 231 that intersects the material 101. In some embodiments, the first camera axis 231 can form a right angle (e.g., about 90 degree angle) with the material 101, or an angle that may be within a range from about 80 degrees to about 100 degrees with the material 101. The first camera 211 can capture one or more images of the material 101, for example, the first major surface 201 of the material 101. In some embodiments, the first camera 211 can comprise one or more imaging lenses 233 (e.g., optical lenses, optical elements, etc.). As disclosed herein, imaging lens(es) (e.g., 233) can comprise an optically transparent and transmissive optical device that focuses or disperses a light beam by refraction. In some embodiments, the first camera 211 can comprise an image sensor 235 that can be positioned to receive the image formed from the one or more imaging lenses 233. As disclosed herein, an image sensor (e.g., 235) can receive, detect, and/or convey data or information that may be used to form an image by converting light intensity into signals. As such, the image sensor 235 can digitize the image formed by the one or more imaging lenses 233 to generate a digital image. In some embodiments, the image sensor 235 can comprise a complementary metal—oxide—semiconductor (CMOS) sensor, a charge-coupled device (CCD) array, or the like. In some embodiments, the first camera 211 can comprise a field of view (FOV) 237 that can define an inspection region of the material 101. The FOV may comprise the extent of the observable area that may be seen at a given time by a camera. In some embodiments, the first camera 211 can comprise a depth of field (DOF) that may be within a range from about 5 microns to about 100 microns, with the DOF measured from the first major surface 201. The DOF can comprise a distance between the nearest and farthest objects that are in acceptably sharp focus in an image.

In some embodiments, the first camera 211 can comprise one or more illumination sources, for example, a first illumination source 239. The first illumination source 239 can comprise a light-emitting diode, for example. In some embodiments, the first illumination source 239 can emit a first light 241, wherein the first light 241 can comprise one or more of a first wavelength $\lambda_1$ (e.g., green light comprising light in the wavelength range between 520 nm and 530 nm), a second wavelength $\lambda_2$ (e.g., red light comprising light in the wavelength range between 615 nm and 631 nm), a third wavelength $\lambda_3$ (e.g., white light comprising light in the wavelength range between about 400 nm and about 750 nm), a fourth wavelength $\lambda_4$ (e.g., white light comprising light in the visible wavelength range between about 400 nm and about 750 nm), etc. In some embodiments, the first illumination source 239 can provide one or more of dark-field illuminations, coaxial illuminations, gradient illuminations, diffuse illuminations, cloudy day illuminations, bright-field illuminations, structured light illuminations, laser illumination etc. of the material 101.

In some embodiments, the second camera 213 can be similar in some respects or identical to the first camera 211. For example, the second camera 213 can comprise a digital camera with a second camera axis 251 that intersects the material 101. In some embodiments, the second camera axis 251 can form a right angle (e.g., about 90 degree angle) with the material 101, or an angle that may be within a range from about 80 degrees to about 100 degrees with the material 101. The second camera 213 can capture one or more images of the material 101, for example, the second major surface 203 of the material 101. In some embodiments, the second camera 213 can comprise one or more imaging lenses 253 (e.g., optical lenses, optical elements, etc.). In some embodiments, the second camera 213 can comprise an image sensor 255 that can be positioned to receive the image formed from the one or more imaging lenses 253. In some embodiments, the image sensor 255 can comprise a CMOS sensor, a CCD array, or the like. The image sensor 255 can digitize the image formed by the one or more imaging lenses 253 to generate a digital image. In some embodiments, the second camera 213 can comprise a field of view (FOV) 257 that can define an inspection region of the material 101. In some embodiments, the second camera 213 can comprise a depth of field (DOF) that may be within a range from about 5 microns to about 100 microns, with the DOF measured from the second major surface 203.

In some embodiments, the second camera 213 can comprise one or more illumination sources, for example, a second illumination source 259. The second illumination source 259 can comprise a light-emitting diode, for example. In some embodiments, the second illumination source 259 can emit a second light 261, wherein the second light 261 can comprise one or more of the first wavelength $\lambda_1$ (e.g., green light comprising light in the wavelength range between 520 nm and 530 nm), the second wavelength $\lambda_2$ (e.g., red light comprising light in the wavelength range between 615 nm and 631 nm), the third wavelength $\lambda_3$ (e.g., white light comprising light in the wavelength range between about 400 nm and about 750 nm), the fourth wavelength $\lambda_4$ (e.g., white light comprising light in the visible wavelength range between about 400 nm and about 750 nm), etc. In some embodiments, the second illumination source 259 can provide one or more of dark-field illuminations, coaxial illuminations, gradient illuminations, diffuse illuminations, cloudy day illuminations, bright-field illuminations, structured light illuminations, laser illumination etc. of the material 101.

In some embodiments, the third camera 215 can be similar in some respects or identical to the first camera 211 or the second camera 213. For example, the third camera 215 can comprise a digital camera with a third camera axis 269 that intersects the material 101. In some embodiments, the third camera axis 269 between the third camera 215 and the first major surface 201 can form an angle relative to the first major surface 201 that may be within a range from about 20 degrees to about 70 degrees. The third camera 215 can capture one or more images of the material 101, for example, an intermediate portion 271 of the material 101 between the first major surface 201 and the second major surface 203. The intermediate portion 271 can comprise a volume or interior of the material 101. In some embodiments, the third camera 215 can comprise one or more imaging lenses 273 (e.g., optical lenses, optical elements, etc.). In some embodiments, the third camera 215 can comprise an image sensor 275 that can be positioned to receive the image formed from the one or more imaging lenses 273. In some embodiments, the image sensor 275 can comprise a CMOS sensor, a CCD array, or the like. The image sensor 275 can digitize the image formed by the one or more imaging lenses 273 to generate a digital image. In some embodiments, the third camera 215 can comprise a field of view (FOV) 277 that can define an inspection region of the intermediate portion 271 of the material 101. In some embodiments, the third camera 215 can comprise a depth of field (DOF) 282 that may be within a range from about 5 microns to about 100 microns, with the DOF measured within the intermediate portion 271. Accordingly, in some embodiments, methods can comprise orienting the third camera axis 269 of the third camera 215 at the angle relative to the first major surface 201 within the range from about 20 degrees to about 70 degrees such that a first image of a first portion of the material 101 can comprise the intermediate portion 271 between the first major surface 201 and the second major surface 203.

In some embodiments, the third camera 215 can comprise one or more illumination sources, for example, a third illumination source 279. The third illumination source 279 can comprise a light-emitting diode, for example. In some embodiments, the third illumination source 279 can emit a third light 281, wherein the third light 281 can comprise one or more of the first wavelength $\lambda_1$ (e.g., green light comprising light in the wavelength range between 520 nm and 530 nm), the second wavelength $\lambda_2$ (e.g., red light comprising light in the wavelength range between 615 nm and 631 nm), the third wavelength $\lambda_3$ (e.g., white light comprising light in the wavelength range between about 400 nm and about 750 nm), the fourth wavelength $\lambda_4$ (e.g., white light comprising light in the visible wavelength range between about 400 nm and about 750 nm), etc. In some embodiments, the third light 281 can provide one or more of dark-field illuminations, coaxial illuminations, gradient illuminations, diffuse illuminations, cloudy day illuminations, bright-field illuminations, structured light illuminations, laser illumination etc. of the material 101.

In some embodiments, the camera apparatus 207 can comprise additional hardware or software components that can assist in controlling the image acquisition by the cameras 211, 213, 215, the power supply to the cameras 211, 213, 215, movement of the cameras 211, 213, 215, etc. For example, the camera apparatus 207 can comprise a computing device 283 (e.g., a computer, server, database, etc.). The computing device 283 can comprise a controller 285 that can control one or more of the operation of the cameras 211, 213, 215 or the movement of the cameras 211, 213, 215. In some embodiments, the controller 285 can comprise a multi-variable controller that can receive image data from the cameras 211, 213, 215. The controller 285 can comprise image processing software for evaluating the captured images of the material 101 and detecting defects within the material 101 based on the captured images. In some embodiments, the controller 285 can comprise a programmable logic controller that can comprise a processor, memory, and/or input/output devices. The controller 285 can comprise computer-readable media for storing instructions for carrying out the inspection methods disclosed herein. In some embodiments, the computing device 283 can comprise a power supply 287 for delivering power to the cameras 211, 213, 215 and/or to any motors that may drive the cameras 211, 213, 215. In some embodiments, the computing device 283 can be coupled to the cameras 211, 213, 215 in several ways that can facilitate the transfer of data and/or power to and/or from the cameras 211, 213, 215. For example, the computing device 283 and the cameras 211, 213, 215 can be coupled via a wired communication line (e.g., Ethernet cables, fiber-optic cables, etc.), a wireless communication method (e.g., Bluetooth, Wi-Fi, etc.), etc.

In some embodiments, the camera apparatus 207 can comprise additional components that can facilitate the capturing of images of the material 101. For example, in some embodiments, the camera apparatus 207 can comprise a diffuser and a mirror that may be arranged on an opposite side of the material 101 from the first camera 211, the second camera 213, and the third camera 215. For example, in some embodiments, the diffuser and the mirror can be positioned on the second side 221 of the material 101 when the first camera 211, the second camera 213, and the third camera 215 are positioned on the first side 219. In some embodiments, the diffuser can scatter the light 241, 261, 281 from the illumination sources 239, 259, 279 to form scattered light within the FOV of the cameras 211, 213, 215. In some embodiments, one or more of the first camera 211, the second camera 213, or the third camera 215 can comprise a beam-splitter that can direct the light 241, 261, 281 toward the material 101.

In some embodiments, the first camera 211, the second camera 213, and the third camera 215 can capture images of different portions of the material 101, such that the defects 121, 123, 225, 227, 229 at differing locations within the material 101 can be clearly imaged and reviewed. For example, due to the first camera 211 comprising a DOF that is at the first major surface 201, images of defects that are located at the first major surface 201, for example, the first defect 225, may be captured. In some embodiments, due to the second camera 213 comprising a DOF that is at the second major surface 203, images of defects that are located at the second major surface 203, for example, the second defect 227, may be captured. In some embodiments, due to the third camera 215 comprising a DOF that is at the intermediate portion 271 of the material 101 between the first major surface 201 and the second major surface 203, images of defects that are located within the intermediate portion 271, for example, the third defect 229, may be captured.

Figure 11:
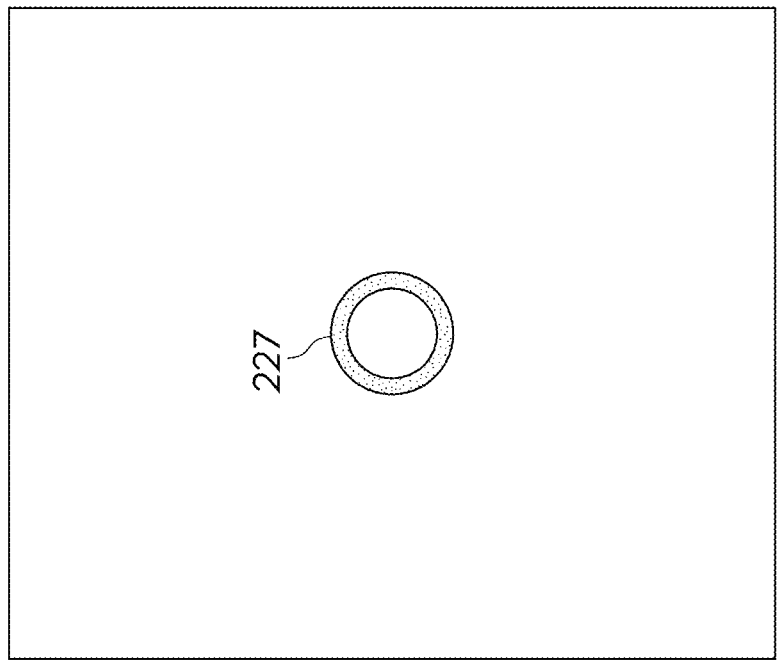
FIG. 11 illustrates an image of a second major surface of the material taken at FIG. 2 and comprising a defect in accordance with embodiments of the disclosure.

In some embodiments, methods of inspecting the material 101 can comprise identifying a defect location of a defect in the material 101. For example, referring briefly to FIG. 1, the first inspection apparatus 103 can initially identify the first defect location 115 of the first defect 121 in the material 101. In some embodiments, the first defect location 115 can comprise an approximate location at which the first defect 121 is located in the material 101. Referring to FIG. 2, following this identification, the second inspection apparatus 105 can capture images at the first defect location 115 to facilitate review of the first defect 121 (e.g., location of the first defect 121 in the Z-direction at or between the first major surface 201 and the second major surface 203, size of the first defect 121, type of the first defect 121, etc.). In some embodiments, methods can comprise capturing a plurality of images of the defect (e.g., the first defect 121) with the camera 211, 213, 215, as the material 101 moves in the first travel direction 113 and the defect (e.g., the first defect 121) moves through the FOV. In some embodiments, the plurality of images can comprise a first image of the first major surface 201 at the first defect location 115, a second image of the second major surface 203 at the first defect location 115, and a third image of the intermediate portion 271 of the material 101 between the first major surface 201 and the second major surface 203 at the first defect location 115. For example, in the embodiments of FIG. 2, the first defect location 115 can comprise a plurality of defects, for example, the first defect 225, the second defect 227, and the third defect 229. In other embodiments, the first defect location 115 may comprise greater than or less than the number of defects illustrated in FIG. 2. The plurality of images of the intermediate portion 271 are illustrated in FIGS. 6-9, while the image of the first major surface 201 is illustrated in FIG. 10 and the image of the second major surface 203 is illustrated in FIG. 11.

In some embodiments, capturing the plurality of images can comprise exposing the defect location (e.g., the first defect location 115) to the light 241, 261, 281 from the illumination source 239, 259, 279. For example, the illumination source 239, 259, 279 can comprise one or more of a dark-field illumination source, a coaxial illumination source, a gradient illumination source, a diffuse illumination source, a cloudy day illumination source, a bright-field illumination source, a structured light illumination source, or a laser illumination source. In some embodiments, a dark-field illumination source can enhance a contrast by illuminating a portion of the material 101 with light that may not be collected by an image sensor and, thus, may not form part of an image. In some embodiments, a coaxial illumination source can comprise a beam-splitter or semi-transparent mirror that diverts lights from an illumination source that may be fixed on a side such that the light may be projected substantially parallel to an optical axis of the camera. In some embodiments, a gradient illumination source can emit light toward the material 101 and an intensity of the illumination can vary in a gradient. In some embodiments, a diffuse illumination source can comprise a diffuser that scatters or spreads light from an illumination source to transmit light. In some embodiments, a cloudy day illumination source can provide a self-contained continuous diffuse lighting by reflecting light from a dome toward the material 101. In some embodiments, a bright-field illumination source can comprise transmitting a white light through the material 101 whereupon contrast in the material 101 can be caused by attenuation of the transmitted light in dense areas of the material 101. In some embodiments, a structured light illumination source can comprise projecting a pattern of light onto the material 101 and, based on the deformation of the light from the material 101, a depth and surface information of the material 101 can be determined. In some embodiments, a laser illumination source can comprise a laser that emits spatially coherent light toward the material 101. In some embodiments, by exposing the defect location to the light 241, 261, 281, one or more of the first illumination source 239, the second illumination source 259, or the third illumination source 279 may transmit the respective first light 241, second light 261, and/or third light 281 toward the material 101. In some embodiments, one or more of the first illumination source 239, the second illumination source 259, or the third illumination source 279 can comprise one or more of the dark-field illumination source, the coaxial illumination source, or the gradient illumination source. In some embodiments, one type of light from one type of illumination source can be transmitted toward the material 101, wherein one of the cameras can capture the image based on the light. In some embodiments, a plurality of different types of illumination from a plurality of types of illumination sources can be transmitted toward the material 101, wherein a plurality of different cameras can capture the light (e.g., each camera can capture one type of light). In this way, the differing types of light that may be captured by the plurality of cameras can provide more images of the defect and, thus, more accurate information regarding the defect. In some embodiments, the moving the material 101 can comprise continuously moving the material 101 along the first travel path 111 while the plurality of images are captured. For example, as disclosed herein, by being moved continuously, the material 101 may not stop moving during the image acquisition by the cameras 211, 213, 215, such that a velocity of the material 101 may remain above zero as the material 101 passes the second inspection apparatus 105.

Figure 10:
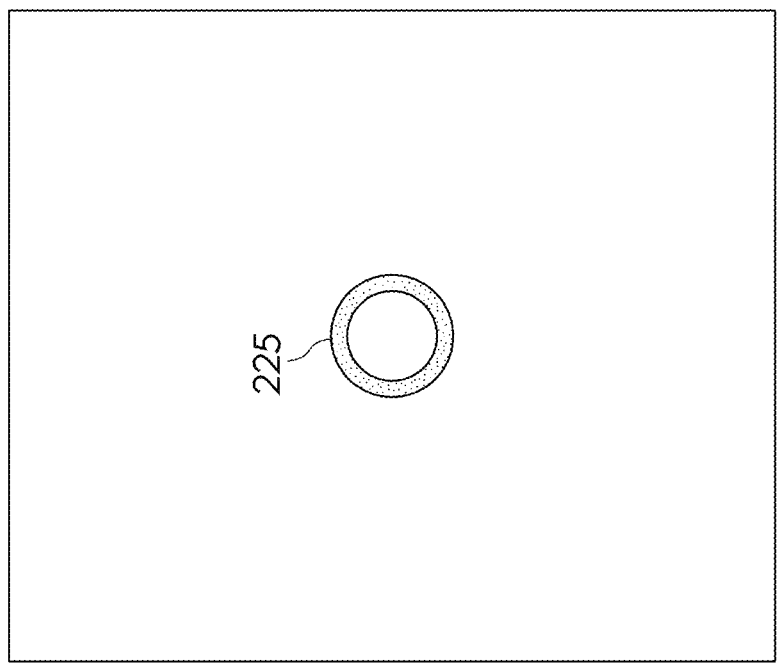
FIG. 10 illustrates an image of a first major surface of the material taken at FIG. 2 and comprising a defect in accordance with embodiments of the disclosure.

Referring to FIGS. 2 and 10, the plurality of images can comprise a first image 1001 of the first major surface 201 of the material 101 at the first defect location 115. For example, as the material 101 moves in the first travel direction 113, the first camera 211 can capture one or more images of the first major surface 201, wherein the one or more images can comprise the first image 1001. The first defect 225 can pass through the FOV of the first camera 211 such that the first image 1001 can display the first defect 225. Referring to FIGS. 2 and 11, the plurality of images can comprise a second image 1101 of the second major surface 203 of the material 101 at the first defect location 115. For example, as the material 101 moves in the first travel direction 113, the second camera 213 can capture one or more images of the second major surface 203, wherein the one or more images can comprise the second image 1101. The second defect 227 can pass through the FOV of the second camera 213 such that the second image 1101 can display the second defect 227.

Referring to FIGS. 2-9, the plurality of images can comprise a third image of the intermediate portion 271 of the material 101 between the first major surface 201 and the second major surface 203 at the first defect location 115. For example, in some embodiments, methods can comprise capturing, with the third camera 215, a plurality of images (e.g., illustrated in FIGS. 6-9) of the intermediate portion 271 of the material 101 between the first major surface 201 and the second major surface 203 of the material 101 at the first defect location 115. As used herein, the third image can refer to one or more of the images (e.g., 601, 701, 801, 901) of the intermediate portion 271 illustrated in FIGS. 6-9, wherein the differing images 601, 701, 801, 901 represent the third defect 229 at differing time periods. Methods can comprise passing the third defect 229 through the FOV as the material 101 moves along the first travel path 111. For example, FIGS. 2-5 illustrate a progression of the material 101 as the material 101 moves in the first travel direction 113 during a time period. Accordingly, in some embodiments, capturing the plurality of images can comprise capturing a first image of the defect (e.g., the third defect 229) within the intermediate portion 271, a second image of the defect (e.g., the third defect 229) within the intermediate portion 271 a first period of time after capturing the first image, and a third image of the defect (e.g., the third defect 229) within the intermediate portion 271 a second period of time after capturing the second image.

Figure 3:
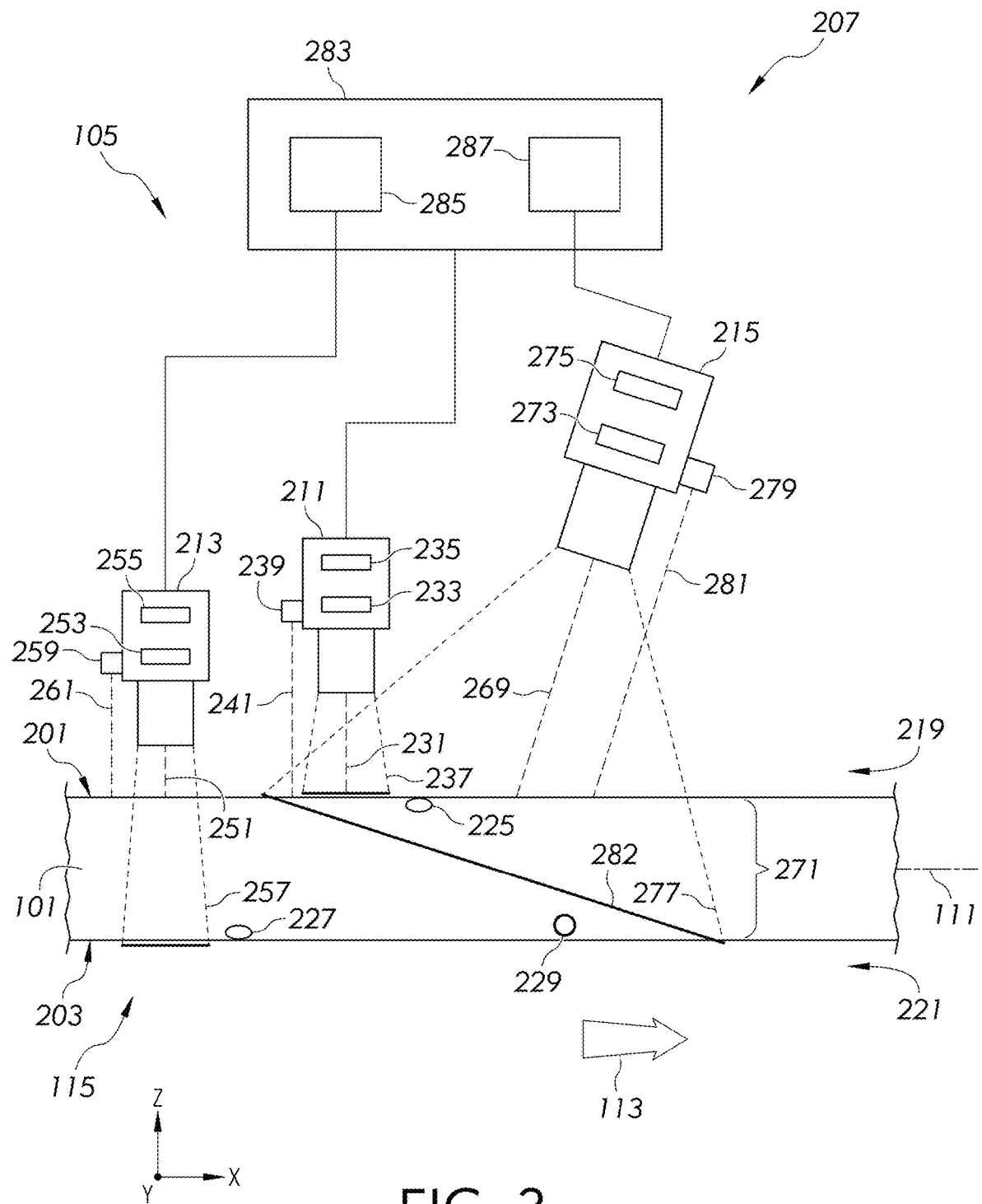
FIG. 3 illustrates a top-down view of the inspection apparatus similar to FIG. 2 after a period of time has passed in accordance with embodiments of the disclosure.
Figure 4:
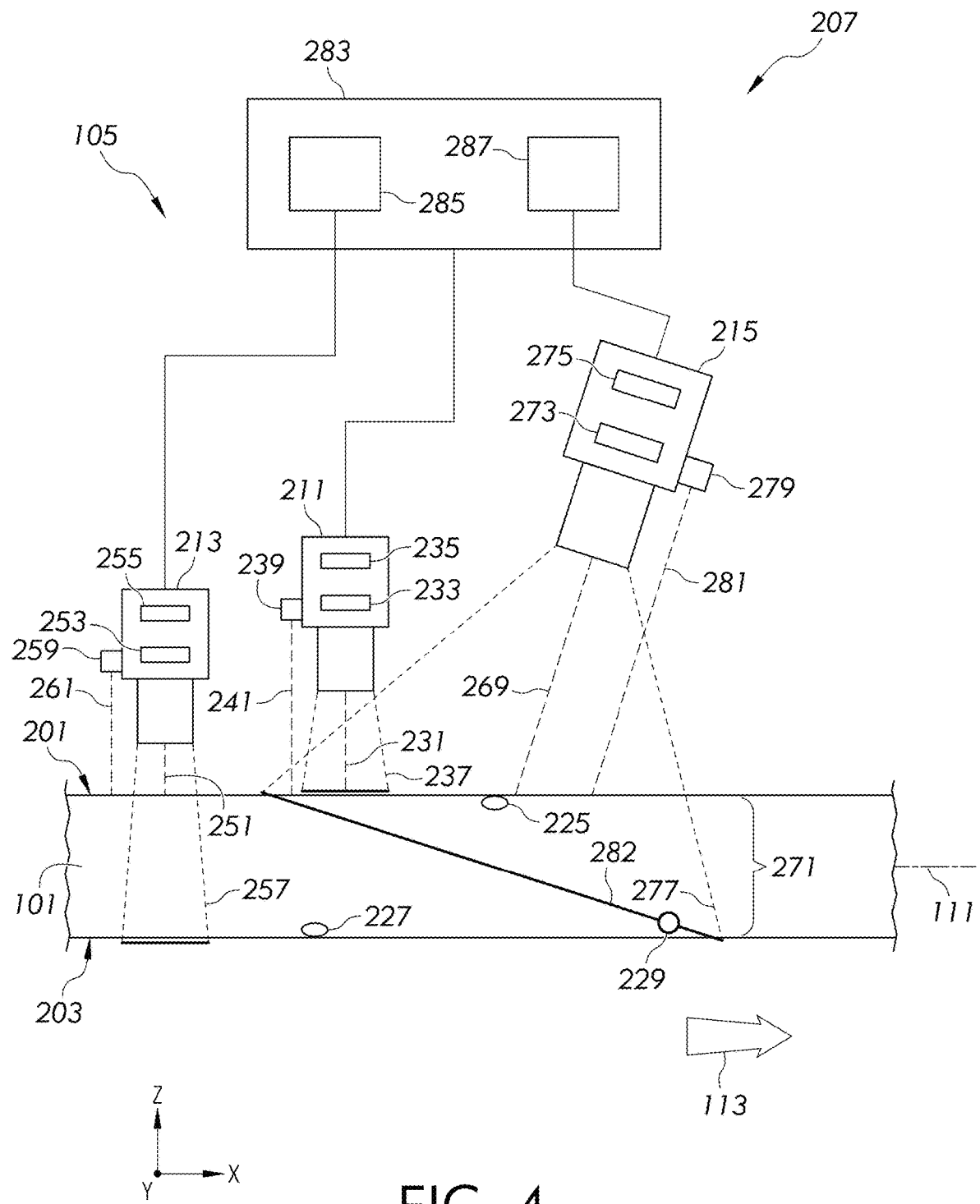
FIG. 4 illustrates a top-down view of the inspection apparatus similar to FIGS. 2-3 after a period of time has passed after FIG. 3 in accordance with embodiments of the disclosure.
Figure 5:
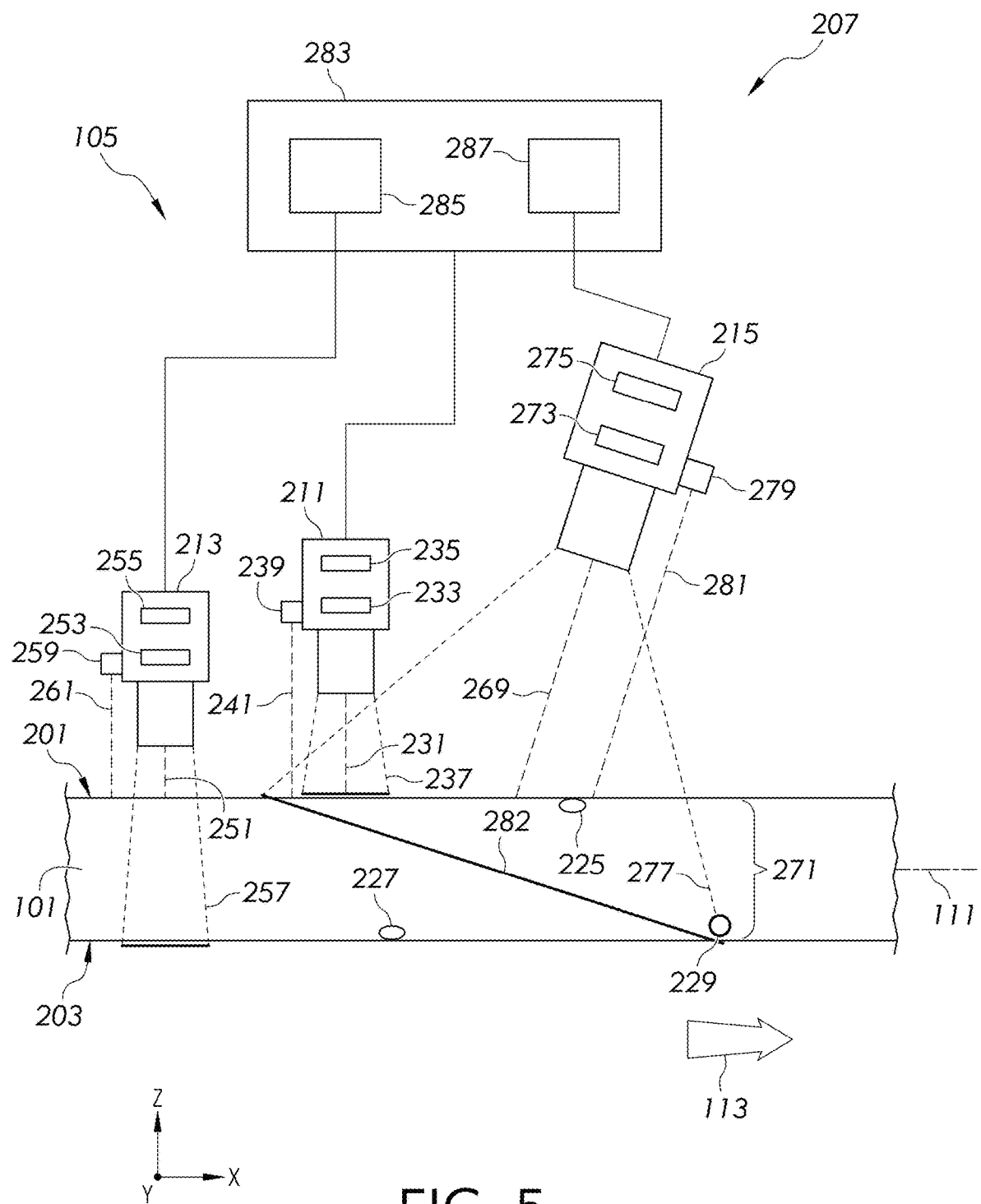
FIG. 5 illustrates a top-down view of the inspection apparatus similar to FIGS. 2-4 after a period of time has passed after FIG. 4 in accordance with embodiments of the disclosure.
Figure 6:
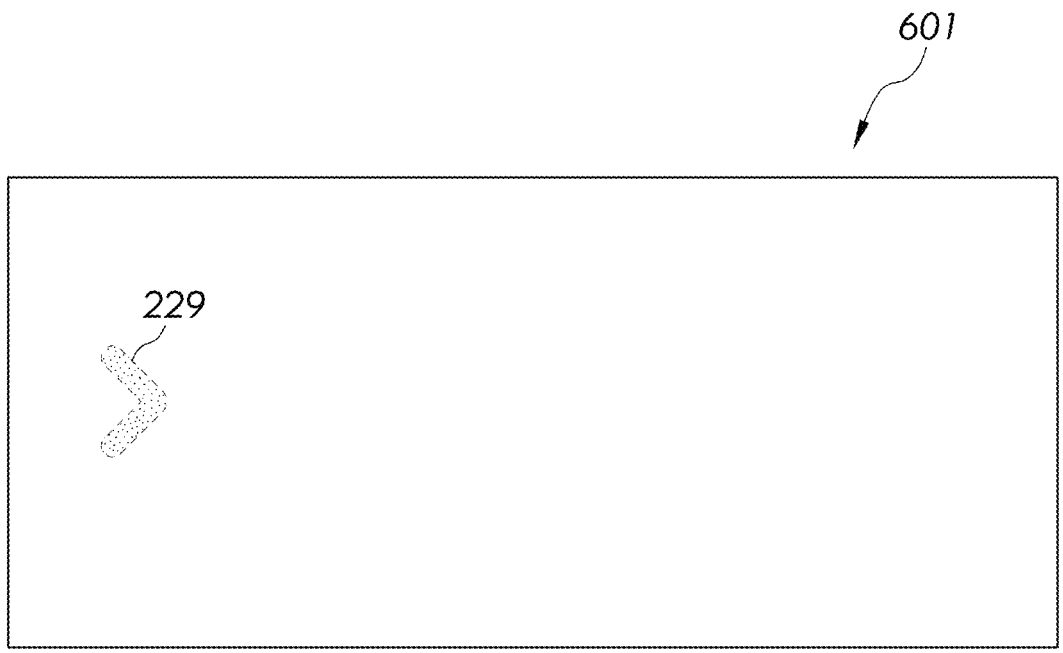
FIG. 6 illustrates an image of an intermediate portion of the material between a first major surface and a second major surface comprising a defect taken at FIG. 2 in accordance with embodiments of the disclosure.
Figure 7:
FIG. 7 illustrates an image of the intermediate portion of the material between the first major surface and the second major surface comprising the defect taken at FIG. 3 after a period of time has passed after FIG. 6 in accordance with embodiments of the disclosure.
Figure 8:
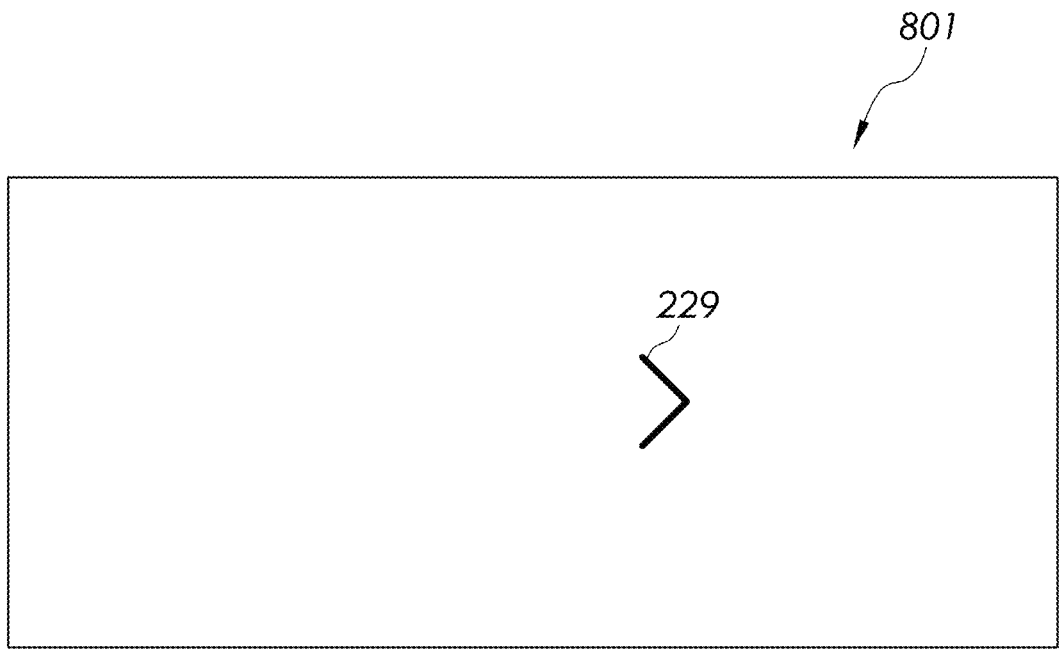
FIG. 8 illustrates an image of the intermediate portion of the material between the first major surface and the second major surface comprising the defect taken at FIG. 4 after a period of time has passed after FIG. 7 in accordance with embodiments of the disclosure.
Figure 9:
FIG. 9 illustrates an image of the intermediate portion of the material between the first major surface and the second major surface comprising the defect taken at FIG. 5 after a period of time has passed after FIG. 8 in accordance with embodiments of the disclosure.

FIG. 2 illustrates the material 101 at a first time (t) in which the third defect 229 has not yet passed through the DOF of the third camera 215. FIG. 3 illustrates the material 101 at a second time (t+1), wherein "1" represents a first time interval after the first time (t) and the third defect 229 has not yet passed through the DOF of the third camera 215 but is in closer proximity to the DOF than in FIG. 2. FIG. 4 illustrates the material 101 at a third time (t+2), wherein "2" represents a second time interval after the first time (t) and the third defect 229 is passing through the DOF of the third camera 215. FIG. 5 illustrates the material 101 at a fourth time (t+3), wherein "3" represents a third time interval after the first time (t) and the third defect 229 has passed through and exited the DOF of the third camera 215. Accordingly, FIG. 3 illustrates a position of the third defect 229 at a time after the third defect 229 is in the position illustrated in FIG. 2. FIG. 4 illustrates a position of the third defect 229 at a time after the third defect 229 is in the position illustrated in FIG. 3. FIG. 5 illustrates a position of the third defect 229 at a time after the third defect 229 is in the position illustrated in FIG. 4. FIG. 6 illustrates a first image 601 of the third defect 229 in the position illustrated in FIG. 2. FIG. 7 illustrates a second image 701 of the third defect 229 in the position illustrated in FIG. 3. FIG. 8 illustrates a third image 801 of the third defect 229 in the position illustrated in FIG. 4. FIG. 9 illustrates a fourth image 901 of the third defect 229 in the position illustrated in FIG. 5.

Referring to FIGS. 2 and 6, the first image 601 can be captured prior to the third defect 229 entering the DOF of the third camera 215, such that the first image 601 can illustrate the third defect 229 at a position that is out of focus. As illustrated in FIG. 6, the third defect 229 may be out of focus and, as such, may lack clarity and sharpness. Referring to FIGS. 3 and 7, the second image 701 can be captured prior to the third defect 229 entering the DOF of the third camera 215, such that the second image 701 can illustrate the third defect 229 at a position that is out of focus. As illustrated in FIG. 7, the third defect 229 of the second image 701 may still be out of focus and, as such, may lack clarity and sharpness. However, due to the third defect 229 being closer to the DOF in FIG. 3 than in FIG. 2, the third defect 229 in the second image 701 may be in better focus than the third defect 229 in the first image 601. Referring to FIGS. 4 and 8, the third image 801 can be captured as the third defect 229 passes through the DOF of the third camera 215, such that the third image 801 can illustrate the third defect 229 at a position that is in focus (or is in better focus than the other images). As illustrated in FIG. 8, the third defect 229 in the third image 801 may in focus and, as such, may be sharp and clear. Accordingly, the third defect 229 in the third image 801 may be in better focus (e.g., and clearer) than either of the first image 601 or the second image 701. Referring to FIGS. 5 and 9, the fourth image 901 can be captured after the third defect 229 exits the DOF of the third camera 215, such that the fourth image 901 can illustrate the third defect 229 at a position that is out of focus. As illustrated in FIG. 9, the third defect 229 of the fourth image 901 may be out of focus and, as such, may lack clarity and sharpness. In some embodiments, the third defect 229 of the fourth image 901 may have a similar clarity to the third defect 229 of the first image 601 or the third defect 229 of the second image 701. However, the third defect 229 of the fourth image 901 may be more out of focus and may be less sharp than the third defect 229 of the third image 801 (e.g., wherein the third image 801 was captured when the third defect 229 was in the DOF of the third camera 215).

As illustrated in FIGS. 2-9, in some embodiments, the capturing of the plurality of images can occur before, during, and after the third defect 229 passes through the DOF of the third camera 215. For example, in some embodiments, capturing the plurality of images can comprise capturing one or more of an image (e.g., the first image 601 or the second image 701) of the material 101 prior to the defect (e.g., the third defect 229) passing through the field of view (FOV) or an image (e.g., the fourth image 901) of the material 101 after the defect (e.g., the third defect 229) exits the field of view (FOV). In this way, in some embodiments, an image (e.g., the third image 801) can be captured with the defect (e.g., the third defect 229) located within the DOF, and another image (e.g., the fourth image 901) can be captured after the defect (e.g., the third defect 229) has exited the DOF.

In some embodiments, methods can comprise reviewing the plurality of images to characterize the defect, for example, the third defect 229. In some embodiments, the characterization of the defect can comprise one or more of a size of the defect, a shape of the defect, a type of the defect, a location of the defect, etc. For example, in some embodiments, methods can comprise reviewing the plurality of images to determine a depth of the third defect 229 from the first major surface 201. To determine the depth of the third defect 229 from the first major surface 201, reviewing the plurality of images can comprise comparing a sharpness of the plurality of images, for example, the first image 601, the second image 701, the third image 801, the fourth image 901, etc. For example, with reference to FIGS. 6-9, the sharpness of the third defect 229 in the plurality of images can be compared. In comparing FIGS. 6 and 7, the third defect 229 in the second image 701 is sharper than the third defect 229 in the first image 601. In comparing FIGS. 7 and 8, the third defect 229 in the third image 801 is sharper than the third defect 229 in the second image 701. In comparing FIGS. 8 and 9, the third defect 229 in the fourth image 901 is less sharp than the third defect 229 in the third image 801. Accordingly, since the plurality of images 601, 701, 801, 901 are captured over a period of time in which the third defect 229 is moving in the first travel direction 113 (e.g., illustrated in FIGS. 2-5), it may be determined that the third defect 229 may be in closer proximity to the second major surface 203 than the first major surface 201 since the third defect 229 is clearer in the latter-occurring images (e.g., in the third image 801). Conversely, if the third defect 229 was located in closer proximity to the first major surface 201, then the third defect 229 can pass through the DOF 282 at an earlier time period. In this way, the images captured of the third defect 229 (e.g., that is in closer proximity to the first major surface 201) may be sharper and more in-focus in the first image 601 or the second image 701 and less sharp and more out of focus in the latter images, for example, the third image 801 and the fourth image 901.

The third camera 215 is not limited to capturing the four images 601, 701, 801, 901 of the third defect 229 at four separate positions. Rather, in some embodiments, the third camera 215 can capture additional images (e.g., more than four images) that can allow for greater accuracy in reviewing the plurality of images and determining the depth of the defect from the first major surface 201. For example, in some embodiments, the third camera 215 can capture seven images of the third defect 229. When the image of the third defect 229 is clearest and most in-focus in the middle of the images (e.g., the third image or the fourth image), then it may be known that the third defect 229 may be located toward a center of a thickness of the material 101 that is approximately equidistant from the first major surface 201 and the second major surface 203. When the image of the third defect 229 is clearest and most in-focus in earlier images (e.g., the first image or the second image), then it may be known that the third defect 229 may be located closer toward the first major surface 201. When the image of the third defect 229 is clearest and most in-focus in latter images (e.g., the sixth image or the seventh image), then it may be known that the third defect 229 may be located closer toward the second major surface 203. Accordingly, by comparing the sharpness and degree of focus of the defects within the plurality of images, methods can comprise determining a location of the defect within the thickness (e.g., Z-direction) of the material 101. In some embodiments, the reviewing can be carried out by a human operator or user, while in other embodiments, the reviewing can be carried out by software or artificial intelligence.

In some embodiments, the first camera 211, the second camera 213, and the third camera 215 can capture images at an image capture rate within a range from about 8 frames per second (fps) to 1000 fps. In some embodiments, the first camera 211, the second camera 213, and the third camera 215 can capture images with an exposure rate of 10 exposures per millisecond (ms), which may be equivalent to 100 fps, with an illumination pulsed about every 1 ms, which may be equivalent to 1000 fps. To further facilitate image acquisition and data transfer with the first camera 211, the second camera 213, and the third camera 215, the second inspection apparatus 105 can use one or more methods of binning (e.g., combining or averaging some pixels of an image), skipping (e.g., skipping the reading of certain pixels), windowing (e.g., selecting a segment of a total pixel value range and then displaying the pixel values within that segment), or subsampling (e.g., reducing image size). In some embodiments, the second inspection apparatus 105 can comprise a distance sensor (e.g., a laser) that can actively measure and track a distance between the cameras 211, 213, 215 and the material 101 as the material 101 moves continuously during the inspection process.

Figure 12:
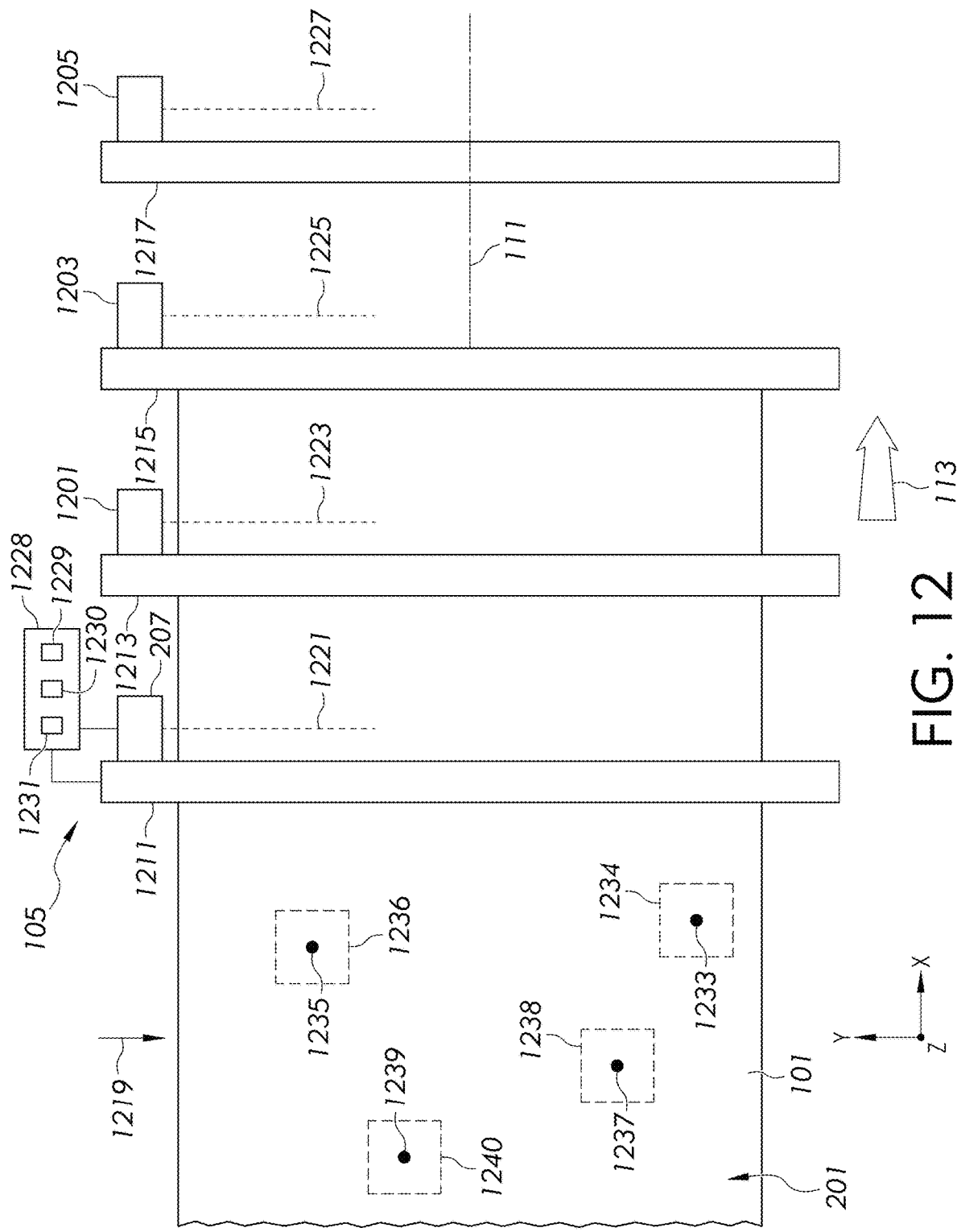
FIG. 12 illustrates a side view of a second inspection apparatus in accordance with embodiments of the disclosure.

Referring to FIG. 12, embodiments of the second inspection apparatus 105 are illustrated. In some embodiments, the second inspection apparatus 105 can comprise one or more camera apparatuses, for example, the camera apparatus 207, a second camera apparatus 1201, a third camera apparatus 1203, a fourth camera apparatus 1205, etc. In some embodiments, one or more of the second camera apparatus 1201, the third camera apparatus 1203, or the fourth camera apparatus 1205 may be substantially identical to the camera apparatus 207. For example, when the second camera apparatus 1201, the third camera apparatus 1203, and the fourth camera apparatus 1205 are substantially identical to the camera apparatus 207, the second camera apparatus 1201, the third camera apparatus 1203, and the fourth camera apparatus 1205 may each comprise the structures of the camera apparatus 207 illustrated and described relative to FIGS. 1-11. For example, the second camera apparatus 1201, the third camera apparatus 1203, and the fourth camera apparatus 1205 can comprise the first camera 211, the second camera 213, the third camera 215, the computing device 283, the controller 285, the power supply 287, etc. However, the second camera apparatus 1201, the third camera apparatus 1203, and the fourth camera apparatus 1205 are not limited to being substantially identical to the camera apparatus 207. For example, in some embodiments, one or more of the second camera apparatus 1201, the third camera apparatus 1203, or the fourth camera apparatus 1205 may comprise some, but not all, portions of the camera apparatus 207, for example by comprising some but not all of the first camera 211, the second camera 213, the third camera 215, the computing device 283, the controller 285, the power supply 287, etc. In some embodiments, the camera apparatus 207 may likewise comprise less than all of the portions illustrated and described relative to FIGS. 1-11, for example, by comprising some but not all of the first camera 211, the second camera 213, the third camera 215, the computing device 283, the controller 285, the power supply 287, etc. Accordingly, the second inspection apparatus 105 may comprise one or more camera apparatuses 207, 1201, 1203, 1205 that may or may not be identical. In addition, in some embodiments, the second inspection apparatus 105 is not limited to comprising the illustrated four camera apparatuses, and, instead, can comprise one or more camera apparatuses.

In some embodiments, the camera apparatuses 207, 1201, 1203, 1205 can be arranged successively along the first travel path 111 in the first travel direction 113. For example, relative to the first travel direction 113, the camera apparatus 207 may be located upstream from the second camera apparatus 1201, and the second camera apparatus 1201 may be located upstream from the third camera apparatus 1203, and the third camera apparatus 1203 may be located upstream from the fourth camera apparatus 1205. In some embodiments, the camera apparatuses 207, 1201, 1203, 1205 can be spaced apart from one another, for example, with an equidistant spacing between adjacent camera apparatuses 207, 1201, 1203, 1205 or non-equidistant spacing.

In some embodiments, the camera apparatuses 207, 1201, 1203, 1205 can each be attached to a guide member 1211, 1213, 1215, 1217. For example, the camera apparatus 207 can be attached to a first guide member 1211, the second camera apparatus 1201 can be attached to a second guide member 1213, the third camera apparatus 1203 can be attached to a third guide member 1215, and the fourth camera apparatus 1205 can be attached to a fourth guide member 1217. The guide members 1211, 1213, 1215, 1217 can facilitate movement of the camera apparatuses 207, 1201, 1203, 1205 in a second travel direction 1219 that is substantially perpendicular to the first travel direction 113. For example, in some embodiments, the guide members 1211, 1213, 1215, 1217 can comprise beams, rods, or other structures to which the camera apparatuses 207, 1201, 1203, 1205 can be movably attached. In some embodiments, the guide members 1211, 1213, 1215, 1217 can each extend linearly along an axis such that the camera apparatuses 207, 1201, 1203, 1205 can be moved along separate axes. For example, the second inspection apparatus 105 can comprise a drive apparatus 1228, one or more of a drive motor 1229, a motor encoder 1230, or a motor controller 1231, etc. that can facilitate controlling movement and a position of the camera apparatuses 207, 1201, 1203, 1205 relative to the material 101. In some embodiments, a single drive apparatus (e.g., the drive apparatus 1228) can be coupled to the camera apparatus 207 and the first guide member 1211 to cause movement of the camera apparatus 207. In some embodiments, substantially identical drive apparatuses (e.g., to the drive apparatus 1228) can be coupled to the other camera apparatuses 1201, 1203, 1205 and the other guide members 1213, 1215, 1217 to cause movement of the other camera apparatuses 1201, 1203, 1205.

Referring to the drive apparatus 1228, in some embodiments, the drive motor 1229, the motor encoder 1230, and the motor controller 1231 may be electrically connected to facilitate the delivery of data (e.g., control instructions, position location data, etc.), power, etc. to one another. In some embodiments, the drive motor 1229 can comprise a precision drive motor that can cause one or more of the camera apparatus 207 to move relative to the guide member 1211, or cause the camera apparatus 207 and the guide member 1211 to move together in unison. In some embodiments, the drive motor 1229 can cause the camera apparatus 207 to move in precise increments such that an accurate position of the camera apparatus 207 relative to the material 101 can be controlled. In some embodiments, the motor encoder 1230 can assist in controlling the operation of the drive motor 1229 and can provide the motor controller 1231 with a measurement of the motor position such that an accurate position of the camera apparatus 207 may be known. In some embodiments, the motor controller 1231 can deliver control instructions to the drive motor 1229 and the motor encoder 1230 along with receiving position instructions from the motor encoder 1230.

In some embodiments, the camera apparatuses 207, 1201, 1203, 1205 can be moved along separate travel paths to match a location of defects within the material 101 as the material 101 moves along the first travel path 111 in the first travel direction 113. For example, the camera apparatus 207 can move along a second travel path 1221 that may be substantially perpendicular to the first travel path 111 and parallel to the second travel path 1221. In some embodiments, the second camera apparatus 1201 can move along a third travel path 1223 that may be substantially perpendicular to the first travel path 111 and parallel to the second travel path 1221. In some embodiments, the third camera apparatus 1203 can move along a fourth travel path 1225 that may be substantially perpendicular to the first travel path 111 and parallel to the second travel path 1221. In some embodiments, the fourth camera apparatus 1205 can move along a fifth travel path 1227 that may be substantially perpendicular to the first travel path 111 and parallel to the second travel path 1221. In some embodiments, a distance separating the second travel path 1221, the third travel path 1223, the fourth travel path 1225, and the fifth travel path 1227 may be reduced due to the camera apparatuses 207, 1201, 1203, 1205 moving in the second travel direction 1219 (e.g., parallel to the Y-axis) but not moving in the first travel direction 113 (e.g., parallel to the X-axis). By not moving in the first travel direction 113 (e.g., parallel to the X-axis), a speed of the camera apparatuses 207, 1201, 1203, 1205 (e.g., comprising the first camera, the second camera, the third camera, etc.) along the first travel path 111 in the first travel direction 113 may be zero. In some embodiments, a distance separating the second travel path 1221 from the third travel path 1223, the third travel path 1223 from the fourth travel path 1225, and/or the fourth travel path 1225 from the fifth travel path 1227 may be within a range from about 300 mm to about 700 mm, or about 500 mm. In some embodiments, one or more of the camera apparatuses 207, 1201, 1203, 1205 can be moved at least partially in the first travel direction 113 (e.g., parallel to the X-axis). For example, by moving one or more of the camera apparatuses 207, 1201, 1203, 1205 in the first travel direction 113 (e.g., parallel to the X-axis), for example, at a speed that may be less than a speed that the material 101 moves in the first travel direction 113, the time at which one of the defects is within a FOV of the camera apparatuses 207, 1201, 1203, 1205 may be increased. Accordingly, the number of images and/or the image quality may be increased due to the increased time that the defect is within a FOV of one of the camera apparatuses 207, 1201, 1203, 1205.

In some embodiments, methods can comprise identifying one or more defect locations prior to moving a camera (e.g., the camera apparatuses 207, 1201, 1203, 1205) and capturing a plurality of images. For example, as illustrated and described with respect to FIG. 1, the first inspection apparatus 103 can identify a defect location of any identified defects. As illustrated in FIG. 12, the material 101 may comprise one or more defects, for example, a first defect 1233 located at a first defect location 1234, a second defect 1235 located at a second defect location 1236, a third defect 1237 located at a third defect location 1238, and a fourth defect 1239 located at a fourth defect location 1240. The defects 1233, 1235, 1237, 1239 may be located at differing locations within the material 101, for example, at differing locations along the X-axis and the Y-axis. To accommodate for these differing locations along the X-axis and the Y-axis, the camera apparatuses 207, 1201, 1203, 1205 can be moved (e.g., along the travel paths 1221, 1223, 1225, 1227) to match the defect locations 1234, 1236, 1238, 1240 along the Y-axis. For example, moving the material 101 can comprise continuously moving the material 101 along the first travel path 111 while images (e.g., a first image, a second image, etc.) are captured.

Figure 13:
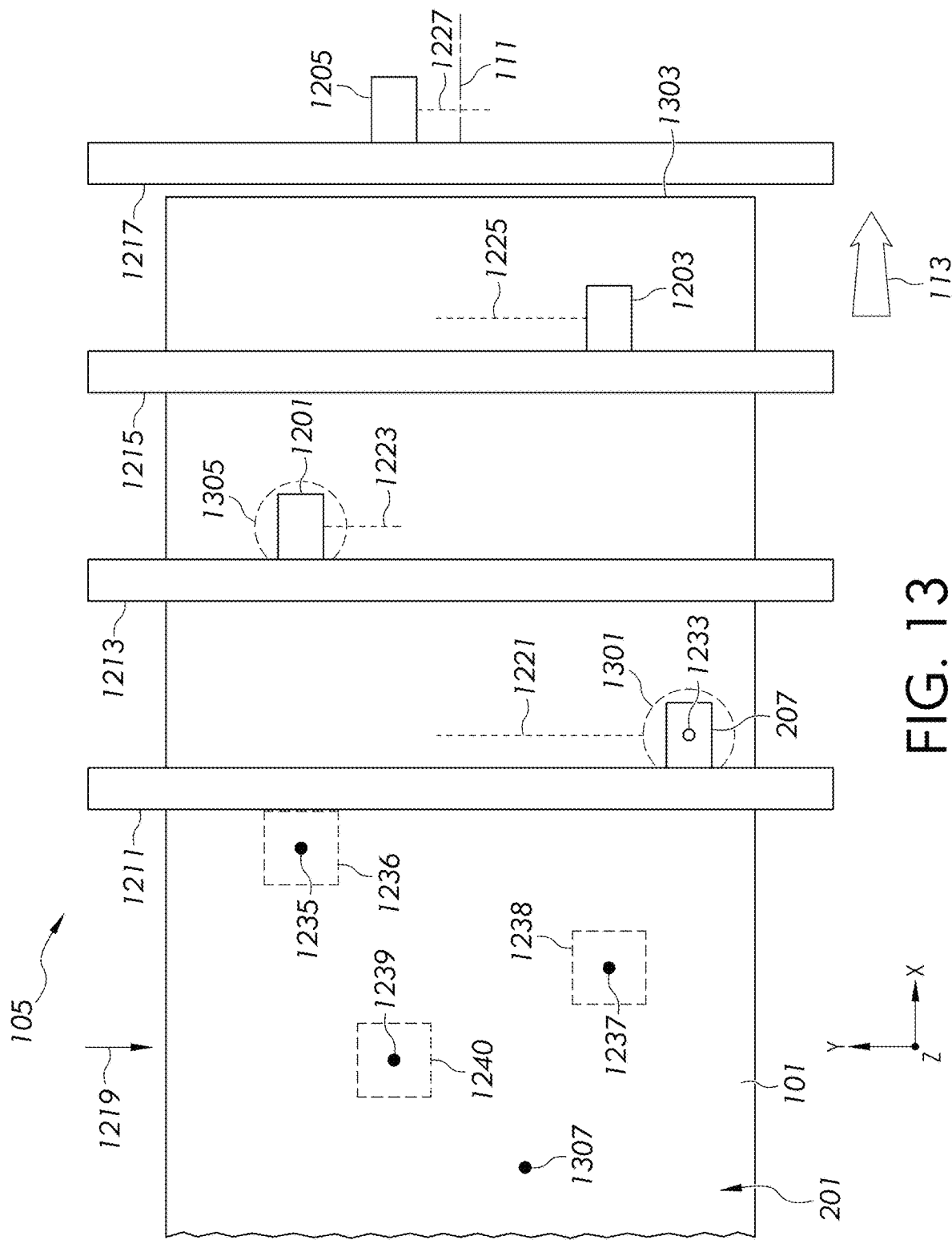
FIG. 13 illustrates a side view of the second inspection apparatus after a period of time has passed after FIG. 12 in accordance with embodiments of the disclosure.

Referring to FIGS. 12-13, in some embodiments, methods can comprise moving a camera (e.g., the camera apparatus 207 comprising the first camera 211, the second camera 213, and/or the third camera 215) along the second travel path 1221 in the second travel direction 1219 that may be substantially perpendicular to the first travel direction 113 such that a field of view (FOV) (e.g., a first field of view (FOV) 1301) of the camera apparatus 207 may move relative to the material 101 along the second travel path 1221 to match the defect location (e.g., the first defect location 1234), wherein the second travel path 1221 may be parallel to the first major surface 201 of the material 101. For example, after the first inspection apparatus 103 (e.g., illustrated in FIG. 1) has identified the defect locations 1234, 1236, 1238, 1240, the camera apparatuses 207, 1201, 1203, 1205 can be moved to a position that can intercept the defects 1233, 1235, 1237, 1239 as the material 101, and, thus, the defects 1233, 1235, 1237, 1239, are moved in the first travel direction 113. For example, in some embodiments, the first travel direction 113 can be in the X-direction while the second travel direction 1219 can be in the Y-direction. The camera apparatus 207 can move in the second travel direction 1219 along the second travel path 1221 to match a position along the Y-axis at which the first defect location 1234 is located. For example, the camera apparatus 207 can reach the desired position along the Y-axis prior to the first defect location 1234 passing through the first FOV 1301. Accordingly, as illustrated in FIG. 13, methods can comprise passing the defect (e.g., the first defect 1233) through the first FOV 1301 as the material 101 moves along the first travel path 111.

In some embodiments, while passing the first defect 1233 through the first FOV 1301, methods can comprise capturing a first image (e.g., one or more of 601, 701, 801, 901, 1001, or 1101) of a first portion of the material 101 at the first defect location 1234 with the camera apparatus 207 (e.g., one or more of the first camera 211, the second camera 213, or the third camera 215). For example, the capturing the first image can comprise capturing one or more images of one or more portions of the material 101 illustrated in FIGS. 2-11. For example, in some embodiments, the first image can comprise one or more of the first major surface 201 of the material 101 at the first defect location 1234, the second major surface 203 of the material 101 at the first defect location 1234, or the intermediate portion 271 (e.g., illustrated in FIG. 2) of the material 101 between the first major surface 201 and the second major surface 203 at the first defect location 1234. For example, as described relative to FIGS. 2-11, the camera apparatus 207 can capture the first image 1001 of the first major surface 201 with the first camera 211. In some embodiments, the camera apparatus 207 can capture the second image 1101 of the second major surface 203 with the second camera 213. In some embodiments, the camera apparatus 207 can capture the plurality of images (e.g., 601, 701, 801, 901) of the intermediate portion 271 with the third camera 215. Accordingly, the first FOV 1301 can comprise one or more of the FOV 237, FOV 257, or FOV 277 depending on the image location.

In some embodiments, passing the first defect 1233 through the first FOV 1301 can occur prior to the second defect 1235 passing through a second FOV 1305 with the third travel path 1223 located downstream from the second travel path 1221 relative to the first travel direction 113. For example, a distance separating the first defect 1233 from a leading edge 1303 (e.g., a front edge of the material 101 relative to the first travel direction 113) of the material 101 may be less than a distance separating the second defect 1235 from the leading edge 1303. Accordingly, the first defect 1233 may be closer to the leading edge 1303 than the second defect 1235. In some embodiments, when a distance separating the first defect 1233 and the second defect 1235 in the X-direction is small, such that the camera apparatus 207 may be unable to capture images of both the first defect 1233 and the second defect 1235 (e.g., due to the camera apparatus 207 being unable to move from the first defect 1233 to the second defect 1235 in time), then the second camera apparatus 1201 can capture images of the second defect 1235. For example, the second camera apparatus 1201 can comprise the second FOV 1305, such that the second camera apparatus 1201 can move in the second travel direction 1219 along the third travel path 1223 to match a position along the Y-axis at which the second defect location 1236 is located. The second camera apparatus 1201 can reach the desired position along the Y-axis prior to the second defect location 1236 passing through the second FOV 1305. Accordingly, as illustrated in FIG. 13, the second camera apparatus 1201 has moved into the desired position along the Y-axis.

Figure 14:
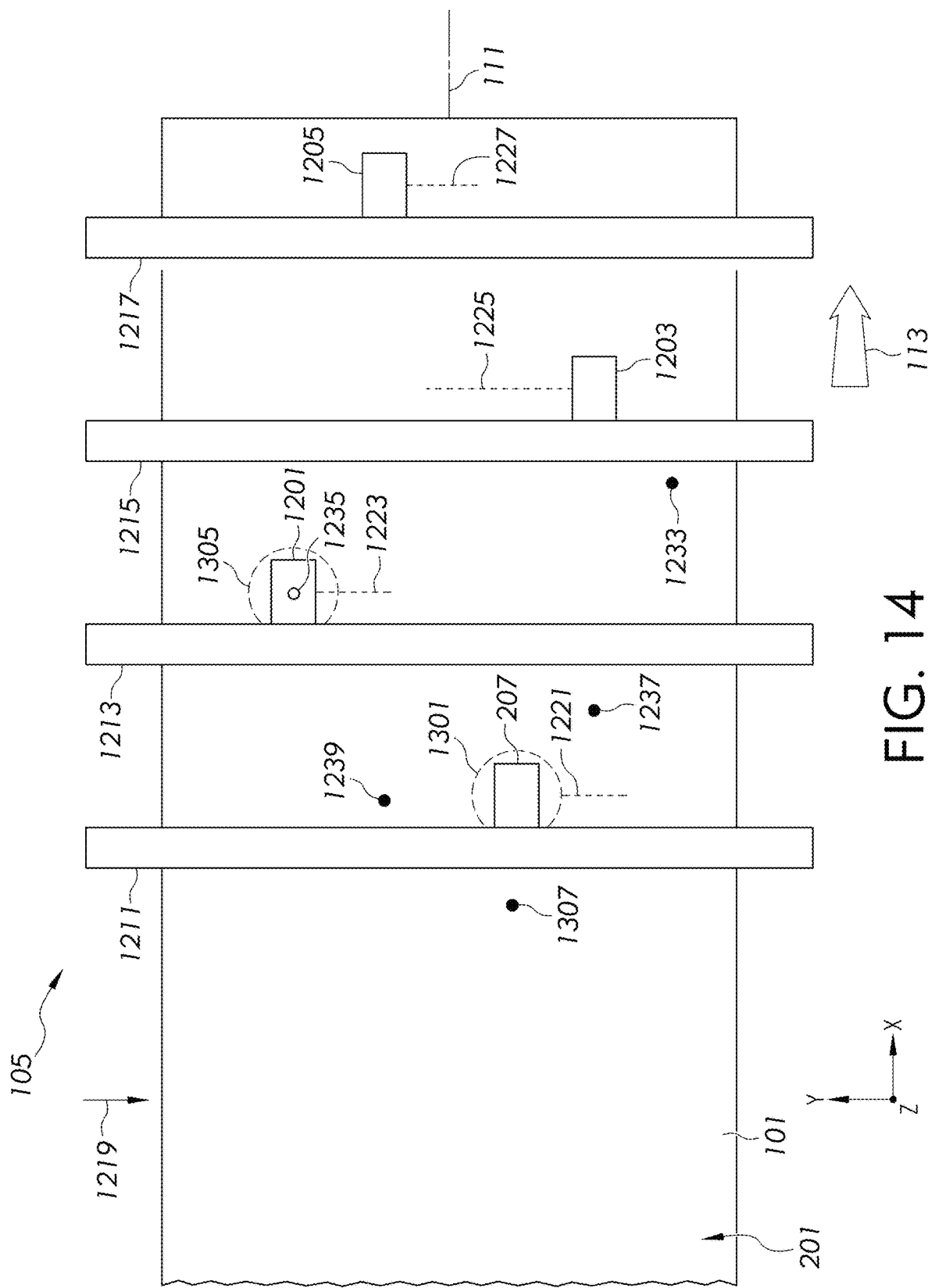
FIG. 14 illustrates a side view of the second inspection apparatus after a period of time has passed after FIG. 13 in accordance with embodiments of the disclosure.

Referring to FIG. 14, in some embodiments, the second defect 1235 can pass through the second FOV 1305. Accordingly, in some embodiments, methods can comprise moving a second camera (e.g., the second camera apparatus 1201 comprising one or more of the first camera 211, the second camera 213, or the third camera 215) along the third travel path 1223 in the second travel direction 1219 such that the second FOV 1305 of the second camera apparatus 1201 may move relative to the material 101 along the third travel path 1223 to match the second defect location 1236. In some embodiments, methods can comprise passing the second defect 1235 through the second FOV 1305 as the material 101 moves along the first travel path 111. In some embodiments, methods can comprise capturing a second image (e.g., one or more of 601, 701, 801, 901, 1001, or 1101) of a second portion of the material 101 at the second defect location 1236 with the second camera apparatus 1201. For example, the capturing the second image can comprise capturing one or more images of one or more portions of the material 101 illustrated in FIGS. 2-11, such that the second image can comprise one or more of the first major surface 201 of the material 101 at the second defect location 1236, the second major surface 203 of the material 101 at the second defect location 1236, or the intermediate portion 271 (e.g., illustrated in FIG. 2) of the material 101 between the first major surface 201 and the second major surface 203 at the second defect location 1236.

In some embodiments, methods can comprise reviewing the first image and the second image (e.g., the first image(s) of the first defect 1233 and the second image(s) of the second defect 1235) to characterize the first defect 1233 and the second defect 1235. For example, the characterization can comprise the location of the first defect 1233 and the second defect 1235 (e.g., located at the first major surface 201, at the second major surface 203, at a location within the intermediate portion 271 between the first major surface 201 and the second major surface 203), the type of defect of the first defect 1233 and the second defect 1235, the size of the of the first defect 1233 and the second defect 1235, etc.

Referring to FIG. 13, in some embodiments, after capturing the first image of the first defect 1233 with the camera apparatus 207, methods can comprise moving the camera apparatus 207 along the second travel path 1221 in a direction (e.g., in the second travel direction 1219 or in a direction that is opposite the second travel direction 1219) such that the first FOV 1301 matches the third defect location 1238 of the third defect 1237 in the material 101. For example, after one of the camera apparatuses (e.g., the camera apparatus 207, for example) has captured images of a defect (e.g., the first defect 1233), the camera apparatus can move along the respective travel path of the camera apparatus to capture another defect. In some embodiments, the camera apparatus 207 can move to a position to capture images of the third defect 1237. For example, methods can comprise passing the third defect 1237 through the first FOV 1301 as the material 101 moves along the first travel path 111, and capturing a third image of a third portion of the material 101 at the third defect location 1238 with the camera apparatus 207. The third portion can comprise, for example, one or more of the first major surface 201, the second major surface 203, or the intermediate portion 271. However, the camera apparatus 207 is not limited to capturing images of the third defect 1237 after capturing images of the first defect 1233. Rather, as illustrated in FIG. 14, in some embodiments, the second inspection apparatus 105 can comprise additional camera apparatuses (e.g., the third camera apparatus 1203, the fourth camera apparatus 1205) that can capture images of the third defect 1237 and the fourth defect 1239. For example, instead of the camera apparatus 207 moving into position to capture images of the third defect 1237, the third camera apparatus 1203 can be moved into position to capture images of the third defect 1237, and the fourth camera apparatus 1205 can be moved into position to capture images of the fourth defect 1239. Accordingly, as illustrated in FIGS. 13-14, the camera apparatus 207 can be moved into position to capture images of a fifth defect 1307.

Referring to FIG. 15, in some embodiments, the second inspection apparatus 105 is not limited to comprising one camera apparatus for each guide member 1211, 1213, 1215, 1217. Rather, in some embodiments, the second inspection apparatus 105 can comprise a plurality of camera apparatuses attached to one guide member. For example, in some embodiments, the second inspection apparatus 105 can comprise the camera apparatus 207 and a third camera apparatus 1501 attached to (and movable with) the first guide member 1211. The third camera apparatus 1501 may be similar or identical to any of the camera apparatuses 207, 1201, 1203, 1205. In some embodiments, the camera apparatus 207 can move to capture images of one defect (e.g., the first defect 1233, for example) while the other camera apparatus (e.g., the third camera apparatus 1501) can move to capture images of a different defect (e.g., the third defect 1237, for example). Accordingly, in some embodiments, methods can comprise moving a third camera (e.g., the third camera apparatus 1501) along the second travel path 1221 in a travel direction (e.g., the second travel direction 1219 or a third travel direction 1502 that is opposite the second travel direction 1219) such that a third FOV 1503 of the third camera apparatus 1501 may move relative to the material 101 along the second travel path 1221 to match the third defect location 1238 of the third defect 1237 in the material 101. In this way, when two defects are located at differing positions along the Y-axis but at similar or identical positions along the X-axis, then images of the two defects can be captured by two separate camera apparatuses that may be attached to and/or moved relative to the first guide member 1211.

In some embodiments, the second inspection apparatus 105 can function as a high-speed inspection apparatus due to one or more of the speed of the material 101 or the speed at which images can be captured. For example, in some embodiments, the material 101 can move continuously (e.g., without stopping) during the image capturing. The material 101 can move, for example, along the first travel path 111 in the first travel direction 113 at a speed that may be within a range of from about 25 millimeters/second (mm/s) to about 500 mm/s. In some embodiments, an exposure of the plurality of cameras may be less than about 5 ms, less than about 100 microseconds, or less than about 10 microseconds. In some embodiments, the exposure of one of the cameras can be determined when the camera stops collecting light, which can be limited by a digital shutter in the image sensor or by an illumination pulse. In some embodiments, one or more of the cameras (e.g., the first camera 211, the second camera 213, and the third camera 215) can capture images at 150 fps, which can equate to a 6.6 ms exposure time. In some embodiments, an exposure time of one or more of the cameras (e.g., the first camera 211, the second camera 213, and the third camera 215) when an image (e.g., the first image, the second image, etc.) is captured may be less than about 2 microseconds. In some embodiments, the exposure time may be controlled by a combination of the illumination source or the camera sensor, due to the exposure time being based on the illumination source being on (e.g., and providing light to the material 101) and a shutter of the camera (e.g., the first camera 211, the second camera 213, and the third camera 215) being open.

In some embodiments, the second inspection apparatus 105 can comprise multiple different types of cameras. For example, in some embodiments, one or more of the camera apparatuses 207, 1201, 1203, 1205 can comprise one or more of the cameras 211, 213, 215. In addition, or in the alternative, in some embodiments, one or more of the camera apparatuses 207, 1201, 1203, 1205 can comprise one or more specialized inspection cameras that may be suited to inspect and capture images of a particular type of defect. For example, due to the reduced spacing between the travel paths 1221, 1223, 1225, 1227 as a result of the limited movement of the camera apparatuses 207, 1201, 1203, 1205 in the first travel direction 113 (e.g., parallel to the X-axis), in some embodiments, the specialized inspection cameras can be provided and may be used to inspect certain defects. For example, initially, the first inspection apparatus 103 can capture images of the material 101 and identify the locations of the defects (e.g., a macro-scan). In some embodiments, the first inspection apparatus 103 can identify certain detects that may be reviewed by the specialized inspection cameras based on a characteristic of the certain defects (e.g., a size of the defect, a location of the defect, a shape of the defect, etc.). In some embodiments, the specialized inspection camera may be well-suited to inspecting these certain defects. Accordingly, the specialized inspection camera may be moved (e.g., along one or more of the travel paths 1221, 1223, 1225, 1227) to capture images of that defect as the material 101 and the defect move in the first travel direction 113. In some embodiments, the specialized inspection camera may comprise a wavefront sensor, a laser sensor, etc. In addition, in some embodiments a certain type of illumination source may be used based on the defect. For example, when the first inspection apparatus 103 identifies one type of defect, the second inspection apparatus 105 can direct a certain type of light from one of the illumination sources toward that defect, wherein the certain type of light may facilitate improved image acquisition of the defect.

The second inspection apparatus 105 can yield several benefits. For example, by comprising a plurality of cameras (e.g., the first camera 211, the second camera 213, and the third camera 215), second inspection apparatus 105 can capture images of a plurality of different portions of the material 101, for example, the first major surface 201, the second major surface 203, and the intermediate portion 271 that is between the first major surface 201 and the second major surface 203. In some embodiments, a series of images of the intermediate portion 271 can be captured. By comparing the series of images, a user can determine a position of a defect located in the intermediate portion 271. In addition, in some embodiments, the plurality of cameras can be moved along an axis, for example, a Y-axis that is perpendicular to a movement direction of the continuously moving material and parallel to the first major surface of the material. By moving the plurality of cameras along the Y-axis, the plurality of cameras can capture images of different defects that may be located at differing locations along the Y-axis. As such, the plurality of cameras can revisit defects that may be initially identified by the first inspection apparatus.

In addition, the plurality of cameras can allow for the material to move continuously during the inspection and revisit process, thus increasing the speed of the process. In some embodiments, to revisit a particular defect, the plurality of cameras can obtain a first set of images of the particular defect at one location along the X-axis, followed by a different plurality of cameras obtaining a second set of images of the particular defect at a different location along the X-axis. In some embodiments, the multiple sets of images of the particular defect can be captured by different cameras, which may be beneficial due to the multiple sets of images (e.g., by different cameras) providing a better confidence rating related to the defect. The confidence ratings can comprise a more accurate position of the defect, size estimation of the defect, characterization of type of the defect, etc. In some embodiments, a first type of illumination can be used in capturing the first set of images of the defect while a second, different type of illumination can be used in capturing the second set of images of the defect. Further, due to the plurality of cameras being located and movable along differing axes, the plurality of cameras can achieve more accurate positioning in the Y-direction while less accurate positioning in the X-direction may be needed. For example, the plurality of cameras can begin capturing images of a defect prior to the defect entering a FOV of the plurality of cameras, and can continue capturing images of the defect as the defect passes through the FOV and even after the defect has exited the FOV. In addition, the plurality of cameras can move a distance along the Y-axis that may exceed a width of the material 101 along the Y-axis, such that the plurality of cameras can capture images of the material 101 along substantially an entire width of the material 101 in the Y-direction.

It should be understood that while various embodiments have been described in detail relative to certain illustrative and specific examples thereof, the present disclosure should not be considered limited to such, as numerous modifications and combinations of the disclosed features are possible without departing from the scope of the following claims.

What is claimed is:
1. A method of inspecting a material comprising:
moving the material along a first travel path in a first travel direction;
identifying a defect location of a defect in the material;
moving a camera along a second travel path in a second travel direction substantially perpendicular to the first travel direction such that a field of view (FOV) of the camera moves relative to the material along the second travel path to match a position of the defect location, the second travel path parallel to a first major surface of the material;
passing the defect through the field of view (FOV) as the material moves along the first travel path;
capturing a plurality of images of the defect with the camera as the material moves in the first travel direction and the defect moves through the FOV, the plurality of images comprising a first image of the first major surface of the material at the defect location, a second image of a second major surface of the material at the defect location, and a third image of an intermediate portion of the material between the first major surface and the second major surface at the defect location; and
reviewing the plurality of images to characterize the defect.

2. The method of claim 1, wherein the moving the material comprises continuously moving the material along the first travel path while the plurality of images are captured.

3. The method of claim 1, wherein the capturing the plurality of images comprises capturing a fourth image of the material prior to the defect passing through the field of view (FOV) and a fifth image of the material after the defect exits the field of view (FOV).

4. The method of claim 1, wherein the capturing the plurality of images comprises exposing the defect location to light from an illumination source, the illumination source comprising one or more of a dark-field illumination source, a coaxial illumination source, a gradient illumination source, a diffuse illumination source, a cloudy day illumination source, a bright-field illumination source, a structured light illumination source, or a laser illumination source.

5. The method of claim 1, wherein the identifying the defect location occurs prior to moving the camera and capturing the plurality of images.

6. The method of claim 1, wherein the material comprises a glass ribbon.

7. A method of inspecting a material comprising:
moving the material along a first travel path in a first travel direction;
identifying a defect location of a defect in the material;
moving a camera along a second travel path in a second travel direction substantially perpendicular to the first travel direction such that a field of view (FOV) of the camera moves relative to the material along the second travel path to match the defect location, the second travel path parallel to a first major surface of the material, a camera axis between the camera and the first major surface forming an angle relative to the first major surface that is within a range from about 3 degrees to about 85 degrees;
passing the defect through the field of view (FOV) as the material moves along the first travel path;
capturing, with the camera, a plurality of images of an intermediate portion of the material between the first major surface and a second major surface of the material at the defect location;
reviewing the plurality of images to determine a depth of the defect from the first major surface.

8. The method of claim 7, wherein the capturing the plurality of images comprises capturing a first image of the defect when the defect is within the intermediate portion, a second image of the defect within the intermediate portion a first period of time after capturing the first image, and a third image of the defect within the intermediate portion a second period of time after capturing the second image.

9. The method of claim 8, wherein the reviewing the plurality of images comprises comparing a sharpness of the first image, the second image, and the third image to determine the depth.

10. The method of claim 8, wherein the first image is captured prior to the defect entering a depth of field of the camera, the second image is captured with the defect located within the depth of field, and the third image is captured after the defect exits the depth of field.

11. A method of inspecting a material comprising:
moving the material along a first travel path in a first travel direction;

identifying a first defect location of a first defect and a second defect location of a second defect in the material;

moving a first camera along a second travel path in a second travel direction substantially perpendicular to the first travel direction such that a first field of view (FOV) of the first camera moves relative to the material along the second travel path to match the first defect location, the second travel path parallel to a first major surface of the material;

moving a second camera along a third travel path in the second travel direction substantially parallel to the second travel path such that a second field of view (FOV) of the second camera moves relative to the material along the third travel path to match the second defect location;

passing the first defect through the first field of view (FOV) as the material moves along the first travel path;

passing the second defect through the second field of view (FOV) as the material moves along the first travel path;

capturing a first image of a first portion of the material at the first defect location with the first camera;

capturing a second image of a second portion of the material at the second defect location with the second camera; and reviewing the first image and the second image to characterize the first defect and the second defect, the characterizing comprising determining one or more of a location of the first defect and the second defect, a type of the first defect and the second defect, or a size of the first defect and the second defect.

12. The method of claim 11, wherein the moving the material comprises continuously moving the material along the first travel path while the first image and the second image are captured.

13. The method of claim 12, wherein a speed of the material along the first travel path in the first travel direction is within a range from about 25 mm/s to about 500 mm/s and wherein a speed of the first camera along the first travel path in the first travel direction is zero.

14. The method of claim 11, wherein an exposure time of one or more of the first camera or the second camera is less than about 2 microseconds.

15. The method of claim 11, wherein the passing the first defect through the first field of view (FOV) occurs prior to the second defect passing through the second field of view (FOV) with the third travel path located downstream from the second travel path relative to the first travel direction.

16. The method of claim 11, further comprising moving a third camera along the second travel path in the second travel direction such that a third field of view (FOV) of the third camera moves relative to the material along the second travel path to match a third defect location of a third defect in the material.

17. The method of claim 11, wherein the first image comprises one or more of the first major surface of the material at the first defect location, a second major surface of the material at the first defect location, or an intermediate portion of the material between the first major surface and the second major surface at the first defect location.

18. The method of claim 11, further comprising, after capturing the first image, moving the first camera along the second travel path in the second direction such that the first field of view (FOV) matches a third defect location of a third defect in the material.

19. The method of claim 18, further comprising passing the third defect through the first field of view (FOV) as the material moves along the travel path and capturing a third image of a third portion of the material at the third defect location with the first camera.

20. The method of claim 11, further comprising orienting a camera axis of the first camera at an angle relative to the first major surface within a range from about 3 degrees to about 85 degrees such that the first image of the first portion comprises an intermediate portion of the material between the first major surface and a second major surface of the material, and the reviewing the first image and the second image comprises determining a depth of the first defect from the first major surface.

* * * * *